United States Patent
Schoeters et al.

(10) Patent No.: US 8,828,465 B2
(45) Date of Patent: *Sep. 9, 2014

(54) MYCOTOXIN BINDER

(71) Applicant: Kemin Industries, Inc., Des Moines, IA (US)

(72) Inventors: Elke Schoeters, Mol (BE); Hankes Li, Sanzao (CN); Stefaan Van Dyck, Brasschaat (BE); Ye Lao, Shangai (CN); Richard Snyder, Des Moines, IA (US)

(73) Assignee: Kemin Industries, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,652

(22) Filed: Jul. 12, 2013

(65) Prior Publication Data

US 2013/0302505 A1    Nov. 14, 2013

Related U.S. Application Data

(63) Continuation-in-part of application No. 13/109,569, filed on May 17, 2011, now Pat. No. 8,507,019.

(60) Provisional application No. 61/345,186, filed on May 17, 2010.

(51) Int. Cl.
| | |
|---|---|
| *A23L 3/3463* | (2006.01) |
| *A23K 1/18* | (2006.01) |
| *A23K 1/175* | (2006.01) |
| *A23K 1/16* | (2006.01) |

(52) U.S. Cl.
CPC ............ *A23K 1/1646* (2013.01); *A23K 1/1893* (2013.01); *A23K 1/175* (2013.01); *A23K 1/184* (2013.01); *A23K 1/1612* (2013.01); *A23K 1/1756* (2013.01); *A23K 1/1615* (2013.01); *A23K 1/1826* (2013.01); *Y10S 426/807* (2013.01)
USPC ............ 426/271; 426/635; 426/654; 426/807

(58) Field of Classification Search
USPC .................................. 426/271, 654, 635, 807
See application file for complete search history.

(56) References Cited

FOREIGN PATENT DOCUMENTS

WO    WO 2008053232 A2 *  5/2008

OTHER PUBLICATIONS

Product "UltraSorb" downloaded from http://www.micronbio-systems.com/pdf/Ultrasorb-Brochure.pdf, 2 pages, dated Nov. 2003.*
Sabater-Vilar, Monica et al., "In vitro assessment of adsorbents aiming to prevent deoxynivalenol and zearalenone mycotixicoses", "Mycopathologia", Dec. 31, 2007, pp. 81-90, vol. 163, Published in: Iran.
Akande, K.E., et al., Nutritional and Health Implications of Mycotoxins in Animal Feeds: A Review. 2006, Pakistan Journal of Nutrition, 5:398-403.
Sohn, H.B., et al., Co-occurrence of *Fusarium* Mycotoxins in Mouldy and Healthy Corn from Korea. 1999, Food Additives and Contaminants, 16:153-158.
Edwards, S.G., Influence of Agricultural Practices on *Fusarium* Infection of Cereals and Subsequent Contamination of Grain by Tricothecenes Mycotoxins. 2004, Toxicology Letters, 153:29-35.
Kubena, L.F., et al., Diminution of aflatoxicosis in growing chickens by the dietary addition of hydrated sodium calcium aluminosilicate. 1990, Poult. Sci., 69:727-735.
Chestnut, A.B., et al., Effects of hydrated sodium calcium aluminosilicate on fescue toxicosis and mineral absorption. 1992, J. Anim. Sci., 70:2838-2846.
Edrington, T.S., et al., Hydrated sodium calcium aluminosilicate, acidic HSCAS and activated charcoal reduce urinary excretion of aflatoxin M1 in turkey poults. Lack of effect by activated charcoal on aflatoxicosis. 1996, Toxicology letters, 89:115-122.
Islam, K.M., et al., Humic Substances in Animal Culture. 2005, Pakistan Journal of Nutrition, 4:126-134.
Osterberg, R., et al., The Growth of Fractal Humic Acids: cluster Correlation and Gel Formation. 1994, Radiation and Environmental Biophysics, 33:269-276.
Riede, U.N., et al., Plumate Induced Activation of Human Granulocytes. 2007, Virchows Archives of Biology: Cell Pathology, 60:27-34.
Sabater-Vilar, M., et al., In Vitro Assessment of Absorbents Aiming to Prevent Deoxynivalenol and *Zearalenone* Mycotoxicosis. 2007, Micropathologia, 163:81-90.
Ye, S., et al., In Vitro Evaluation of the Efficacy of Sodium Humate as an Aflatoxin B1 Absorbent. 2009, Australian Journal of Basic and Applied Sciences, 3:1296-1300.
Van Rensburg, C.J., In Vitro and In Vitro Assessment of Humic Acid as an Aflatoxin Binder in Broiler Chickens. 2006, Poultry Science, 85:1576-1583.

* cited by examiner

*Primary Examiner* — Chhaya Sayala
(74) *Attorney, Agent, or Firm* — Davis, Brown, Koehn, Shors & Roberts, P.C.; Kent A. Herink

(57) ABSTRACT

A mycotoxin binder is disclosed characterized by 45% or more humic acid, maximum solubility of 20% at pH between 1.5 and 7.0, and an in vitro mycotoxin binding efficiency of at least 80% and preferably 90% with adsorption of at least 85% at pH 3.0 and desorption less than 10% at pH 6.8.

2 Claims, 3 Drawing Sheets

MYCOTOXIN BINDER

This application claims priority to U.S. patent application Ser. No. 13/109,569, filed May 17, 2011, which claims priority to U.S. Patent Application Ser. No. 61/345,186 filed May 17, 2010 and incorporates the same herein in their entireties by this reference.

BACKGROUND OF THE INVENTION

The present invention relates generally to mycotoxin binders and, more specifically, to mycotoxin binders utilizing humic compounds.

Mycotoxins are invisible, odorless and cannot be detected by smell or taste, but can result in great economic losses at all levels of agricultural feed production and especially in animal production. Mycotoxins are secondary metabolites produced by filamentous fungi such as *Fusarium, Aspergillus*, and *Penicillium* prior to and during harvest, or during (improper) storage. Their toxic effects are very diverse (Akande, K. E., Abubakar, M. M., Adegbola, T. A., and Bogoro, S. E. 2006 Nutritional and Health Implications of Mycotoxins in Animal Feeds: A Review. *Pakistan Journal of Nutrition*, 5: 398-403). In farm animals, mycotoxins have negative effects on feed intake, animal performance, reproductive rate, growth efficiency, immunological defense as well as been carcinogenic, mutagenic, teratogenic, cause tremors or damage the central nervous system, hemorrhagic, as well as causing damage to the liver and kidneys. Mycotoxins are metabolized in the liver and the kidneys and also by microorganisms in the digestive tract. Therefore, often the chemical structure and associated toxicity of mycotoxin residues excreted by animals or found in their tissues are different from the parent molecule (Ratcliff, J. The Role of Mycotoxins in Food and Feed Safety. Presented at Animal Feed Manufacturers Association, Aug. 16, 2002). Various mycotoxins may occur simultaneously, depending on the environmental and substrate conditions (Sohn, H. B., Seo, J. A., and Lee, Y. W. 1999 Co-occurrence of *Fusarium* Mycotoxins in Mouldy and Healthy Corn from Korea. *Food Additives and Contaminants*, 16: 153-158). Considering this coincident production, it is very likely, that animals are exposed to mixtures rather than to individual compounds. Field studies have shown that more severe toxicosis in animals can result from the additive and synergistic effects of different mycotoxins (Ratcliff, 2002). The problem of mycotoxins does not just end in animal feed or reduced animal performance, many become concentrated in meat, eggs and milk of animal and can pose a threat to human health. There is increasing concern about levels of mycotoxins in human foods, both from vegetable origin and animal origin.

Although there are geographic and climatic differences in the production and occurrence of mycotoxins, exposure to these substances is worldwide. Mycotoxins are estimated to affect as much as 25 percent of the world's crops each year (Akande, 2006). Most countries have stringent regulation on mycotoxin levels in feed and the main goal of agricultural and food industries is the prevention of mycotoxin contamination in the field. Management practices to maximize plant performance and decrease plant stress can decrease mycotoxin contamination substantially. This includes planting adapted varieties, proper fertilization, weed control, necessary irrigation, and proper crop rotation (Edwards, S. G. 2004 Influence of Agricultural Practices on *Fusarium* Infection of Cereals and Subsequesnt Contamination of Grain by Tricothecenes Mycotoxins. *Toxicology Letters*, 153: 29-35). But even the best management strategies cannot eliminate mycotoxin contamination in years favorable for disease development.

Among the various mycotoxins identified especially affecting poultry, some occur significantly in naturally contaminated foods and feeds. They are aflatoxin; ochratoxin, zearalenone, T-2 toxin, vomitoxin and fumonisin. They cause detrimental effects on birds, such as growth impairment, immune depression, and paleness in broilers, which finally bring out economic losses.

Aflatoxin B1, a metabolite of fungus *Aspergillus flavus* and *Aspergillus parasiticus*, is an extremely hepatotoxic compound that frequently contaminates poultry feeds at low levels. Another family of mycotoxins produced by *Penicillium* and *Aspergillus* genera is ochratoxin. Ochratoxin, being the most potent toxin, adversely affects production parameters and the health of poultry. Ingestion of ochratoxin causes severe kidney damage. T-2 toxin induces severe inflammatory reactions and neural disturbances in animals and humans, whereas zearalenone appears to have no effect on poultry health and performance. Poultry rations with high levels of *Fusarium* contamination have been associated with poor performance, feed refusal, diarrhea, leg weakness, oral lesions, and/or high mortality.

The toxicity and clinical signs observed in animals when more than one mycotoxin is present in feed are complex and diverse. Mycotoxins are usually accompanied by other unknown metabolites which may have synergistic or additive effects. The ability of binders to alleviate the adverse effects of the several combinations of mycotoxins present naturally in feed on productivity and serum biochemical and hematological parameters remains yet to be explored.

Practical methods to detoxify mycotoxin contaminated grain on a large scale and in a cost-effective manner are not currently available. At present, one of the more promising and practical approaches is the use of adsorbents. However, several adsorbents have been shown to impair nutrient utilization (Kubena, L. F., R. B. Harvey, T. D. Phillips, D. E. Corrier, and W. E. Huff. Diminution of aflatoxicosis in growing chickens by the dietary addition of hydrated sodium calcium aluminosilicate. Poult. Sci. 69:727-735. 1990) and mineral adsorption (Chestnut, A. B., P. D. Anderson, M. A. Cochran, H. A. Fribourg, and K. D. Twinn. 1992. Effects of hydrated sodium calcium aluminosilicate on fescue toxicosis and mineral absorption. J. Anim. Sci. 70:2838-2846) and lack binding effects against multiple mycotoxins of practical importance (Edrington, T. S.; Sarr, A. B.; Kubena, L. F.; Harvey, R. B.; Phillips, T. D. (1996). Hydrated sodium calcium aluminosilicate (HSCAS), acidic HSCAS, and activated charcoal reduce urinary excretion of aflatoxin M1 in turkey poults. Lack of effect by activated charcoal on aflatoxicosis. Toxicology letter, 89: 115-122).

Zearalenone (ZEA) causes hyperestrogenism in swine when ingested at levels as low as 1 μg/g feed. Pathology in swine is more pronounced in prepubertal gilts and are characterized by tumefaction of the vulva, prolapses of the vagina and rectum and enlargement of the mammary glands. In cycling animals, effects of zearalenone include conception failure, pseudopregnancy and abortion. The metabolism of ZEA seems to occur essentially in the liver leading to α and β zeatalenol. The enzyme believed to catalyze reduction of ZEA to zearalenol is 3-α-hydroxysteroid dehydrogenase (3α-HSD). This enzyme is also known to degrade 5-α androstan-3,17-dione, a product of steroid hormone metabolism. As known in several studies, ZEA and its metabolites are excreted mainly via feces and urine. Swine are more sensitive to ZEA than other classes of livestock, and feeding regimens that minimize losses due to feed wastage and poor performance are desirable. Some compounds (i.e. fiber, formalin, sodium carbonate and monomethylamine) has been shown to protect against numerous xenobiotisc, including ZEA effects.

The use of mold inhibitors or preservation by acids can only reduce the amount of mold but does not influence the content of mycotoxins generated prior to treatment. If mycotoxins have been produced earlier they will not be affected in any form by mold inhibitors or acid mixtures, as they are very stable compounds. Thus these toxic compounds remain in the formerly infected commodity even if no further mold can be seen or detected. The most commonly used strategy of reducing exposure to mycotoxins is the decrease in their bioavailability by the inclusion of various mycotoxin binding agents or adsorbents, which leads to a reduction of mycotoxin uptake and distribution to the blood and target organs. Major advantages of adsorbents include expense, safety and the ease to add to animal feeds. Various substance groups have been tested and used for this purpose, with aluminum silicates, in particular clay and zeolitic minerals, as the most commonly applied groups.

Humic acids are ubiquitous and are found wherever matter is being decomposed or has been transposed, as in the case of sediments. They are natural components of drinking water, soil and lignite. Humic substances have a strong affinity to bind various substances, such as heavy metals, herbicides, different mutagens, monoaromatic and polycyclic aromatic compounds and minerals. Farmers use humates to accelerate seed germination and improve rhizome growth for many years (Islam, K. M., Schuhmacher, S. A., and Gropp, M. J. 2005 Humic Substances in Animal Culture. *Pakistan Journal of Nutrition*, 4: 126-134). The materials are able to stimulate oxygen transport, accelerate respiration and promote efficient utilization of nutrient by plants (Osterberg, R. and Mortensen, K. 1994 The Growth of Fractal Humic Acids: Cluster Correlation and Gel Formation. *Radiation and Environmental Biophysics*, 33: 269-276). These observations prompted scientists to study the specific properties of humates and their possible benefits in improving health and well being of humans and animals. Humic substances have been used as an anti-diarrheal, analgesic, immune-stimulatory and growth promoting agents in veterinary practices in Europe (Islam, 2005). Humic acids inhibit bacterial and fungal growth, thus indirectly decrease levels of mycotoxins in feed (Riede, U. N., Zeck-Keapp, G., Freudenberg, N., Keller, H. U., and Seubert, B. 2007 Humate Induced Activation of Human Granulocytes. *Virchows Archives of Biology: Cell Pathology*, 60: 27-34). Some humic substances and their salts have been described to directly interact with mycotoxins by their mycotoxin binding capacity (Sabater-Vilar, M., Malekinejad, H., Selman, M. H. J., Ven Der Doelen, M. A. M., and Fink-Gremmels, J. 2007, In Vitro Assessment of Absorbents Aiming to Prevent Deoxynivalenol and Zearalenone Mycotoxicosis. Micropathologia, 163: 81-90; Ye, S., Lv, X., and Zhou, A. 2009 In Vitro Evaluation of the Efficacy of Sodium Humate as an Aflatoxin B1 Adsorbent. *Australian Journal of Basic and Applied Sciences*, 3: 1296-1300; Jansen van Rensburg, C., Van Rensburg, C. E. J., Van Ryssen, J. B. J., Casey, N. H., and Rottinghaus, G. E. 2006 In Vitro and In Vivo Assessment of Humic Acid as an Aflatoxin Binder in Broiler Chickens. *Poultry Science*, 85: 1576-1583).

SUMMARY OF THE INVENTION

The new group of mycotoxin binders disclosed are humic acid containing substances. Preferably, the mycotoxin binders have a minimum humic acid content of 45%, maximum solubility of approximately 20% at pH 1.5, 3.0 and 7.0, and in vitro mycotoxin binding efficiency of at least 80%, and preferably 90%, with minimal adsorption at the pH of the stomach of a monogastric animal of at least 80%, and preferably at least 85%, and maximal desorption at neutral pH of not greater than 10%. In a preferred embodiment, the humic substances are combined with an adsorbent, such as clay, to provide an effective mycotoxin binder in vivo.

DESCRIPTION OF THE INVENTION

Figure 1:
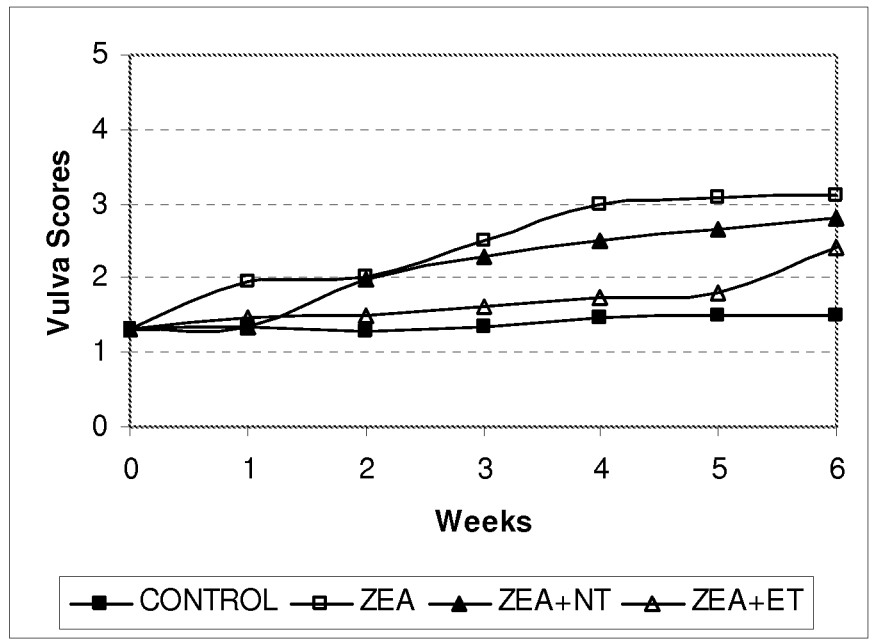
FIG. 1 is a chart of average weekly vulva scores for all groups of gilts; standard errors ranged from 0.3 to 0.5.

The present invention includes compositions to be added to animal feeds that may be contaminated with one or more mycotoxins. The compositions include humic substances, preferably humic substances containing between 45% and 99% humic acids, including all levels within such range. The compositions should have a high affinity for the specific mycotoxins being addressed, resulting in the formation of a strong complex between the composition and the targeted mycotoxin that will not be disrupted by solubility in the gastrointestinal tract so that the mycotoxin will be excreted in the feces. Accordingly, it is preferred that the compositions not have solubility greater than 20% at pH between 1.5 to 7.5. Compositions of the present invention found to be effective in vivo have in vitro binding efficiencies of greater than 80%, and preferably greater than 90%, with minimal absorption at ph 3.0 of at least 80%, and preferably 85%, and maximal desorption at pH 6.8 of not more than 10%.

Humic substances suitable for the present invention can be obtained from many sources, but a preferred source is leonardite. The humic substances are preferably combined with one or more sources of metal ions, oxides and clay minerals. Preferably, the humic substances are combined with a clay, such as bentonite or sepiolite, in amounts ranging from 10% to 90% of a source of humic substances combined with amounts of the clay ranging from 90% to 10%, and all ratios in between.

Humic Acids in Natural Substances

Humic acids are formed through the chemical and biological humification of organic matter, particularly plants and through the biological activities of micro-organisms. They are found in the brown organic matter of a variety of soils, as well as in peats, manure, lignite, leonardite and brown coals. In soils they also may be formed by certain secondary processes such as polymerization of polyphenols leached by rain from surface leaf litter, and condensation of phenols, quinones, and proteins that are provided by the action of soil micro-organisms and small animals on soil carbohydrates.

Humic acids do not have a single unique structure, but are a mixture of intermediate chemical products resulting from the decomposition and conversion of lignin and other plant materials to hard coal. They are three dimensional macrocolloidal molecules with a polyaromatic center containing iso- and heterocyclic structures and peripheral side-chains. The organic structure of humic acid is naturally oxidized, giving it a negative charge. Positive ions, attracted to broken bonds at the site of the oxidation, create sites for micronutrients and micro-flora to attach. Low-grade coals, called lignite, contain more acids than high-grade coals. Leonardite is a particular formation of highly oxidized lignite. This material has the highest humic acids content of any natural source.

Example 1

An experiment was conducted to determine the humic acid content of five natural humic acid containing substances. The humic acids were measured by a volumetric method with titration of the extracts according to the International Standard (ISO 5073:1999 Brown coals and lignites. Determination of humic acids).

The results of the analyses of the humic acid containing substances are shown in Table 1. The disclosed minimum requirement of 45% humic acid was exceeded by all products, except for HS3 (28.34%) and HS4 (44.62%).

TABLE 1

Humic acid content determined by ISO 5073: 1999.

| Humic acid containing substance | Humic acid content (%) |
|---|---|
| HS1 | 46.31 |
| HS2 | 64.84 |
| HS3 | 28.34 |
| HS4 | 44.62 |
| HS5 | 67.45 |

Solubility of Humic Acid Containing Substances at Different pH

Most humic acid substances are chemically attached to inorganic components (clay or oxides), and a smaller part gets dissolved in the solutions or the soil, particularly under alkaline conditions. An important feature of humic substances is that they can combine with metal ions, oxides and clay minerals to form water soluble or insoluble complexes and can interact with organic compounds such as alkenes, fatty acids, capillary-active substances and pesticides.

Adsorbents used to hinder the gastrointestinal absorption of mycotoxins should have a high affinity for the specific mycotoxins, resulting in the formation of a strong complex that will not be disrupted and that is excreted via the feces. This implicates that humic acids, as the main active compounds, may not be dissolved at any location in the gastrointestinal tract. The disclosed humic acid substances may not have solubility higher than 20% at pH 1.5; 3.0 and 7.0 (i.e. minimal 80% retentate recovery).

Example 2

An experiment was conducted to determine the non-soluble part of humic acid containing substances. Briefly, an amount of 0.15 g product was dissolved in 75 ml 0.1M phosphate buffer (adjusted to pH 1.5; 3.0 or 7.0) and was incubated for one hour at room temperature on a magnetic stir plate (600 rpm). All suspensions were filtered through a 55 mm filter (Macherey-Nagel, MN GF-4). The retentate was dried for two hours at 130° C. The retentate amount was calculated as the mass difference between empty filter and filter+dried retentate. Recovery (%) was calculated as the ratio 'retentate amount'/'mass product' and expressed as percentage. The samples were analyzed in triplicate and means were calculated. The reference material was purified humic acid (HA, Sigma Aldrich. Lot 0001411101, cas number: 1415-93-6).

Recovery of the non-soluble fraction of the HA suspension at pH 7 was not possible. Filtration of this suspension could not be performed, because of 'floating substances' that were formed during the incubation step which made the filter non-permeable. The experiment was repeated in citrate buffer adjusted to pH 6.2. However the results were the same. The other suspensions of the products could easily be filtered at each pH tested. The results of the recovered retentates are shown in Table 2. All but two products met the minimum retentate recovery of 80% at the different pH conditions. Recovery of the retentate of HS 1 was too low at pH 1.5; recovery of the retentates of HS3 was too low at all pH levels tested.

TABLE 2

Non-soluble fraction of humic acid containing substances at different pH, expressed as % mass recovered in retentate.

| | pH | | | | | |
|---|---|---|---|---|---|---|
| | 1.5 | | 3 | | 7 | |
| | mean | stdev | mean | stdev | mean | stdev |
| HA | 80.97 | 4.13 | 84.65 | 3.18 | ND | ND |
| HS1 | 78.41 | 0.97 | 80.46 | 1.14 | 85.40 | 0.48 |
| HS2 | 85.02 | 1.21 | 86.54 | 0.80 | 84.23 | 0.75 |
| HS3 | 67.80 | 0.78 | 68.16 | 0.93 | 64.14 | 2.62 |
| HS4 | 80.75 | 1.58 | 84.54 | 2.30 | 92.13 | 0.42 |
| HS5 | 83.24 | 0.85 | 84.73 | 0.46 | 86.47 | 2.02 |

ND: retenate recovery of HA at pH 7 not determined

Example 3

In a second experiment on solubility of humic acid containing substances, 0.015 g (instead of 0.15 g) of the products HS2, HS3 and HA was dissolved in 75 ml 0.1M phosphate buffer (pH 1.5; 3.0 or 7.0).

After incubation for one hour at room temperature on a magnetic stir plate, the morphology of the suspensions of the three products tested clearly differed (FIG. 1). The results of the recovered retentates are shown in Table 3. The dark brown color of the suspension of HA at pH 7 corresponded with high solubility of the product at this pH (Table 3).

TABLE 3

Non-soluble fraction of humic acid containing substances at different pH, expressed as % mass recovered in retentate.

| | pH | | | | | |
|---|---|---|---|---|---|---|
| | 1.5 | | 3 | | 7 | |
| | mean | stdev | mean | stdev | mean | stdev |
| HA | 103.17 | 2.69 | 128.41 | 8.93 | 54.82 | 5.74 |
| HS2 | 107.86 | 10.44 | 115.98 | 7.56 | 121.25 | 11.06 |
| HS3 | 106.88 | 8.59 | 126.59 | 9.57 | 91.24 | 2.02 |

In vitro Mycotoxin Binding Capacity of Humic Acid Containing Substances

During the adsorption process the mycotoxin is not really bound to the surface of the binder. The electrostatic forces that join the toxin with the binder are not permanent links, which means that the adsorption process is reversible. A change of the surrounding environment of the mycotoxin binder (e.g. in the digestive tract) can have a dramatic effect on the binding efficacy. The major parameter that has an influence is the pH of the environment. Changes in pH can change both the mycotoxin and the surface of the binder, causing a modification of the attraction between the two. In an animal, in the foregut the conditions of low pH may promote adsorption of mycotoxins, while further in the digestive tract (more neutral pH) the mycotoxin may be released again. Because of the vast effect of pH on the adsorption it is of primordial importance to use an in vitro system that mimics the change of the pH conditions along the gastrointestinal tract.

Example 4

A study was performed on the in vitro evaluation of the mycotoxin detoxifying efficiency of potential sequestering humic acid containing substances against zearalenone. Adsorption in an acidic environment (pH 3.0)—mimicking the pH of the stomach of a monogastric animal—and desorption at near neutral pH (pH 6.8)—mimicking pH conditions in the intestine of a monogastric animal—were measured. The net percentage of mycotoxin detoxifying efficiency was determined as adsorption percentage minus desorption percentage.

Duplicate aliquots of 0.1M phosphate buffer (adjusted to pH 3.0) containing 300 ppb zearalenone in solution (10 ml) were added to 15 ml screw cap Falcon polypropylene tubes to which had been added 0.05 gram of each adsorbent. Test tubes were placed on an orbital shaker for 60 minutes at room temperature. Each mycotoxin test solution was centrifuged at 4000 rpm for 10 minutes. The aqueous supernatant was isolated for mycotoxin analysis (adsorption). The pellet was resuspended in 0.1 M phosphate buffer pH 6.8. Test tubes were placed again on an orbital shaker for 60 minutes at room temperature and afterwards centrifuged at 4000 rpm for 10 minutes. The aqueous supernatant was analyzed for zearalenone (desorption). The zearalenone concentrations were determined using ELISA (Euro-Diagnostica). Buffered zearalenone test solutions (pH 3.0 or 6.8) without adsorbents were used as standard.

A summary of the in vitro mycotoxin adsorption by five samples is presented in Table 4. The results showed that all the products effectively adsorbed zearalenone at pH 3.0 (adsorption above the minimal required value of 85%), except for HS3. Notable differences were observed for the desorption at pH 6.8. The products HS3 and HS4 both were shown to exceed the maximal value of 10% desorption. The other three samples met the requirement. Only products HS2 and HS5 fulfilled the minimal required in vitro binding efficacy of 90%.

TABLE 4

In vitro binding of zearalenone by humic acid containing substances at pH 3.0 and 6.8.

| | in vitro ZEA Binding | | | | |
|---|---|---|---|---|---|
| | Absorption (%) | | Desorption (%) | | Efficiency (%) |
| Adsorbent | mean | SD | mean | SD | mean |
| HS1 | 92.32 | 5.01 | 8.91 | 0.48 | 83.40 |
| HS2 | 96.20 | 2.39 | 3.12 | 1.77 | 93.08 |
| HS3 | 80.68 | | 35.70 | | 44.99 |
| HS4 | 86.65 | 13.54 | 26.57 | 0.40 | 59.95 |
| HS5 | 96.78 | 2.07 | 1.70 | 0.28 | 96.36 |

Example 5

Two humic acid substances (HS2 and HS3) were compared to purified humic acid (HA, Sigma Aldrich. Lot 0001411101, cas number: 1415-93-6) in an in vitro mycotoxin binding assay similar to the test described in example 4, with the only modification that the zearalenone detection was performed by HPLC analysis, after extraction of the mycotoxin by an AOZ column (VICAM, USA).

The HPLC analyses were performed on an SP8800 Ternary LC Solvent Delivery System with helium degassing (Spectra Physics, USA), a SP 8880 autosampler (Spectra Physics, USA) with 20 μl loop, a Chromjet integrator (Thermo, USA), a Croco Cil™ column heater (Cluzeau Info Labo, France) and an UV-fluorescence detector FP-920 (Jasco, Japan), Chromsep Nucleosil 100-5 C18 SS 250*4.6 mm (L*ID) columns (Varian, the Netherlands) or equivalent. The columns were protected with an appropriate guard column. An aliquot of the original buffered zearalenone test solution was used as the HPLC standard.

The results are summarized in Table 5. The data of HS2 and HS3 confirmed the results of example 4. Adsorption of zearalenone on purified humic acid at pH 6.8 was very high (96.93%). However at pH 6.8, 30.83% of the bounded zearalenone was released again.

TABLE 5

In vitro binding of zearalenone by humic acid containing substances at pH 3.0 and 6.8. Results are mean values of duplicate analysis. For HS3, only single analyses were available.

| | in vitro ZEA Binding | | | | |
|---|---|---|---|---|---|
| | Absorption (%) | | Desorption (%) | | |
| Adsorbent | mean | SD | mean | SD | Efficiency (%) |
| HS2 | 94.40 | 0.56 | 2.96 | 0.48 | 91.44 |
| HS3 | 86.03 | | 31.71 | | 54.33 |
| HA | 96.93 | 0.36 | 30.83 | 0.51 | 66.10 |

In conclusion, two products HS2 and HS5 fulfilled all three preferred characteristics for improved mycotoxin binders of the present invention.

Example 6

Materials and Methods

Solutions used for total humic acid determination in humic acid containing substances. Humic acids were measured by a volumetric method with titration of the extracts according to the International Standard (ISO 5073:1999 Brown coals and lignites. Determination of humic acids). Table 6 gives an overview of the different solutions used in the procedure.

TABLE 6

Solutions used for humic acid determination

| Solution | Composition |
|---|---|
| Sodium pyrophosphate | 15 g $Na_4P_2O_7(10H_2O)$ + 7 g NaOH in $H_2O$ up to 1 L |
| Sodium hydroxide | 10 g NaOH in $H_2O$ up to 1 L |
| Potassium dichromate standard solution | 4.9036 g $K_2Cr_2O_7$, previously dried at 130° C., in $H_2O$ up to 1 L |
| Potassium dichromate oxidizing solution | 20 g $K_2Cr_2O_7$ in $H_2O$ up to 1 L |
| 1,10-phenanthroline indicator | 1.5 g 1,10-phenanthroline + 1 g $(NH_4)2Fe(SO_4)2 \cdot 6H_2O$ |
| Sulphuric acid | concentrated, $\rho_{20}$ = 1.84 g/ml |
| Ammonium ferrous sulphate | 40 g $(NH_4)2Fe(SO_4)2 \cdot 6H_2O$ + 20 ml $H_2SO_4$ in $H_2O$ up to 1 L |

The ammonium ferrous sulphate titration solution was standardized against the potassium dichromate standard solution for each batch of samples to be analyzed. Twenty five ml of potassium dichromate standard solution was pipetted into a 300 ml conical flask. Seventy ml was added to 80 ml of water. Carefully 10 ml of concentrated sulphuric acid and 3 drops of 1,10-phenantholine indicator were added. After cooling, the solution was titrated with the ammonium ferrous sulphate standard solution to a red colour. The concentration was calculated, in moles per L, of the ammonium ferrous sulphate solution as follows (1): where c is the concentration, expressed in moles per L, of the ammonium ferrous sulphate solution; V is the volume of ammonium ferrous sulphate solution required for the titration.

$$c = 0.1 \times \frac{25}{V} \quad (1)$$

Extraction of total humic acids. Five humic acid containing substances, hereafter called leonardite, were obtained. Table 7 gives an overview of the source of each leonardite. For the extraction of the humic acids, 0.2±0.0002 g of analysis sample was weighed into a conical flask. Hundred fifty ml of alkaline sodium pyrophosphate extraction solution (total humic acids) was added and mixed until the sample was thoroughly wetted. A small funnel was placed on the flask and heated in the boiling water bath for 2 h, shaking frequently to ensure precipitation of insoluble material. The flask was removed from the water bath, allowed to cool to room temperature and the extract and residue was transferred to a 200 ml volumetric flask. The extract was diluted to the mark with water and shaken to ensure thorough mixing.

Determination of total humic acids. For the determination of the humic acids in the extracts, 5 ml of extract was pipetted into a 250 ml to 300 ml conical flask. Five ml of potassium dichromate oxidizing solution was added into the flask. Carefully 15 ml of concentrated sulphuric acid was added. The solution was placed in a boiling water bath for 30 min. the solution was cooled to room temperature and diluted to approximately 100 ml. Three drops of 1,10-phenanthroline indicator were added to the solution and titrated with the ammonium ferrous sulfate titration solution to a brick red color. As blank samples for total humic acids, 5 ml of extract is replaced by 5 ml sodium pyrophosphate.

Calculation of total humic acids. The total humic acid content ($w_{HA,t}$) was calculated as a percentage by mass, of the sample as analysed according to the following formula (2) where 0.003 is the millimole mass of carbon, in g/mmol; $V_0$ is the volume of the ammonium ferrous sulphate titration solution used in the blank titre, in ml; $V_1$ is the volume of the ammonium ferrous sulphate titration solution used in the extract titre, in ml; c is the concentration of the ammonium ferrous sulphate titration solution, in mol/L; $V_e$ is the volume of the extract, in ml; $V_a$ is the volume of the aliquot taken for titration, in ml; 0.59 is the average ratio of carbon content of humic acids for brown coals and lignites; m is the mass of the sample taken for the test, in g.

$$w_{HA} = \frac{(V_0 - V_1) \times 0.003 \times c}{0.59 \times m} \times \frac{V_e}{V_a} \times 100$$

TABLE 7

Sources of leonardite

| Leonardite | Source |
| --- | --- |
| HS1 | Xuguang Jieneng Co., Ltd, Yunnan Province, China |
| HS2 | Poortershaven, Rotterdam, The Netherlands |
| HS3 | HuminTech, Düsseldorf, Germany |
| HS4 | Pingxiang Jiali Ceramic Materials Co., Ltd, Jiangxi Province, China |
| HS5 | Double Dragons Humic Acid Co. Ltd. Xinjiang, China |

Solubility of leonardite samples at different pH. An experiment was conducted to determine the non-soluble part of leonardite samples. Briefly, 0.15 g of sample was dissolved in 75 ml solution with adjusted pH of 1.5, 3.0 or 7.0. The solution at pH 1.5 was a Clark and Lubs solution composed of 25 ml 0.2M KCl, 20.7 ml 0.2M HCl diluted to 100 ml with MilliQ water (Millipore, Brussels, Belgium). The solution at pH 3.0 was 0.1M $NaH_2PO_4$ adjusted to pH using $H_3PO_4$ (Acros, Geel, Belgium); the solution at pH 7.0 was 0.1M $Na_2HPO_4.2H_2O$ adjusted to pH using 0.1M $NaH_2PO_4$. All chemicals were from VWR International, Leuven, Belgium). The suspension was incubated for one hour at room temperature on a magnetic stir plate (600 rpm). After one hour, all suspensions were filtered through a 55 mm glass fibre filter (GF-92, Whatman, Dassel, Germany). The retentate was dried for two hours in an oven at 130° C. The retentate amount was calculated as the mass difference between empty filter and filter+dried retentate. Recovery (%) was calculated as the ratio 'retentate amount'/'mass product' and expressed as percentage. The samples were analysed in triplicate and means were calculated. The reference material was purified humic acid (HA, Sigma Aldrich, Bornem, Belgium). Recovery of the non-soluble fraction of the HA suspension at pH 7 was not possible. Filtration of this suspension could not be performed, because of 'floating substances' that were formed during the incubation step which made the filter non-permeable. The experiment was repeated in 0.1M citrate solution ($C_6H_5Na_3O_7.2H_2O$ in MilliQ water) adjusted to pH 6.2 using $C_6H_8O_7.H_2O$ for samples HS2, HS3 and HA. However the results were the same. The other suspensions of the products could easily be filtered at each pH tested. In order to resolve the solubility issue of humic acid at pH 7, the experiment was repeated using only 0.02 g of sample instead of 0.15 g. Only samples HS2, HS3 and HA were repeated. All other test conditions remained the same.

In vitro mycotoxin binding capacity of humic acid containing substances. Details about the in vitro method can be found in the internal instruction LB-IV-20/142-E[2]; Determination of mycotoxin detoxifying efficiency in a "two-phase procedure" coupled with HPLC analysis. However, modification of this procedure was necessary because the leonardite included in the new toxin binder product severely interfered with HPLC detection of the mycotoxins when supernatants were injected directly in the HPLC system. Therefore, an immunoaffinity column (IAC, Vicam, USA) clean-up step is used (see below for more details).

Adsorption in an acidic environment (pH 3.0)—mimicking the pH of the stomach of a monogastric animal—and desorption at near neutral pH (pH 6.8)—mimicking pH conditions in the intestine of a monogastric animal—were measured. The net percentage of mycotoxin detoxifying efficiency was determined as adsorption percentage minus desorption percentage. Duplicate aliquots of 0.1M phosphate solution (adjusted to pH 3.0) containing 300 ppb zearalenone in solution (10 ml) were added to 15 ml screw cap Falcon polypropylene tubes to which had been added 0.05 gram of each adsorbent. Test tubes were placed on an orbital shaker for 60 minutes at room temperature. Each mycotoxin test solution was centrifuged (5000-12000 g) for 10 minutes until a clear solution was obtained. The aqueous supernatant was isolated for zearalenone analysis (adsorption). The pellet was resuspended in 0.1M phosphate solution pH 6.8. Test tubes were placed again on an orbital shaker for 60 minutes at room temperature and afterwards centrifuged. The aqueous supernatant was isolated for zearalenone analysis (desorption). After centrifugation of the solution at pH 3.0 and 6.8, an IAC clean-up step is introduced. After discarding the protective liquid from the IAC columns, columns were washed with 8 ml phosphate buffered saline (PBS) solution pH 7.4. Then, a 3 ml of supernatant was applied to the column. Afterwards, the column was washed with 20 ml mQ water and dried using mild vacuum for a few seconds. Zearalenone was eluted with 3 ml of 2% (v/v) glacial acetic acid in methanol (MeOH) into glass tubes. The whole eluate was evaporated until dry under a gentle stream of $N_2$ at 60° C. and redissolved in 1.5 ml acetonitril/mQ water 60/40 (v/v) prior to HPLC analysis. The zearalenone concentrations were determined using both HPLC (all samples) and ELISA (HS1, HS2, HS4, HS5). Zearalenone test solutions (pH 3.0 or 6.8) without adsorbents were used as standard.

Results

Determination of total humic acid content in different leonardite samples. The results of the analyses are shown in Table 8. The total humic acid content in samples 2 and 5 is the highest; sample 1 and 4 show medium levels and sample 3 is the lowest.

TABLE 8

Total humic acid content in leonardite samples (n = 2)

| Sample | Average | SD |
|---|---|---|
| HS1 | 46.31 | 0.81 |
| HS2 | 64.84 | 0.29 |
| HS3 | 31.01 | 0.38 |
| HS4 | 44.62 | 0.36 |
| HS5 | 67.45 | 2.15 |

Solubility of leonardite samples at different pH. The results of the recovered retentates at different pH using a phosphate solution are shown in Table 9. Sample HS3 showed the highest solubility over the tested pH range. The retentate of humic acid at pH 7 could not be recovered. At pH 7 it was completely dissolved, forming slurry. This slurry blocked the filters. The test was repeated with HA, HS2, HS3 and a citrate solution at pH 6.2; Table 10 shows the results for HA were the same using the citrate solution. The results of the recovered retentates using only 0.02 g of HA, HS2, HS3 and the phosphate solution are shown in Table 11. Because of the lower sample concentration the filters did not block and recovery could be calculated. It is clear that humic acid shows the highest solubility at pH 7 compared to all other samples. This was also confirmed by visual inspection of the samples after incubation. Due to the error in weighing and recovering small sample quantities, the standard deviations were large. Therefore preference should be given to using 0.2 g of sample.

TABLE 9

Non-soluble fraction of leonardite, expressed as % mass recovered in retentate (phosphate, n = 3).

| | pH | | | | | |
|---|---|---|---|---|---|---|
| | 1.5 | | 3 | | 7 | |
| | mean | stdev | mean | stdev | mean | stdev |
| HA | 80.97 | 4.13 | 84.65 | 3.18 | / | / |
| HS1 | 78.41 | 0.97 | 80.46 | 1.14 | 85.40 | 0.48 |
| HS2 | 85.02 | 1.21 | 86.54 | 0.80 | 84.23 | 0.75 |
| HS3 | 67.80 | 0.78 | 68.16 | 0.93 | 64.14 | 2.62 |
| HS4 | 80.75 | 1.58 | 84.54 | 2.30 | 92.13 | 0.42 |
| HS5 | 83.24 | 0.85 | 84.73 | 0.46 | 86.47 | 2.02 |

TABLE 10

Non-soluble fraction of leonardite, expressed as % mass recovered in retentate (citrate, n = 3).

| | mean | stdev |
|---|---|---|
| HA | / | / |
| HS2 | 100.82 | 2.20 |
| HS3 | 53.06 | 1.96 |

TABLE 11

Non-soluble fraction of leonardite, expressed as % mass recovered in retentate (0.02 g sample, n = 3).

| | pH | | | | | |
|---|---|---|---|---|---|---|
| | 1.5 | | 3 | | 7 | |
| | mean | stdev | mean | stdev | mean | stdev |
| HA | 103.17 | 2.69 | 128.41 | 8.93 | 54.82 | 5.74 |
| HS2 | 107.86 | 10.44 | 115.98 | 7.56 | 121.25 | 11.06 |
| HS3 | 106.88 | 8.59 | 126.59 | 9.57 | 91.24 | 2.02 |

In vitro mycotoxin binding capacity of leonardite. A summary of the in vitro mycotoxin adsorption analysed by ELISA is presented in Table 12; by HPLC in Table 13. The results show that all the products effectively adsorb zearalenone at pH 3.0, HS3 having the lowest adsorption. Notable differences were observed for the desorption at pH 6.8. HS3 and HS4 both show a high degree of desorption compared to the other samples.

TABLE 12

In vitro binding of zearalenone by leonardite samples, assessed using ELISA (n = 4).

| | Adsorption (%) | | Desorption (%) | | Efficacy (%) | |
|---|---|---|---|---|---|---|
| | mean | stdev | mean | stdev | mean | stdev |
| HS1 | 92.32 | 5.01 | 8.91 | 0.48 | 83.40 | 4.53 |
| HS2 | 96.20 | 2.39 | 3.12 | 1.77 | 93.08 | 4.16 |
| HS4 | 86.65 | 13.54 | 26.57 | 0.40 | 59.95 | 14.00 |
| HS5 | 96.78 | 2.07 | 1.70 | 0.28 | 96.36 | 2.04 |

TABLE 13

In vitro binding of zearalenone by leonardite samples, assessed using HPLC (n = 3).

| | Adsorption (%) | | Desorption (%) | | Efficacy (%) | |
|---|---|---|---|---|---|---|
| | mean | stdev | mean | stdev | mean | stdev |
| HA | 96.93 | 0.36 | 30.83 | 0.51 | 66.10 | 0.19 |
| HS2 | 94.40* | 0.56 | 2.96 | 0.48 | 91.44 | 1.04 |
| HS3 | 82.47 | 3.13 | 34.37 | 3.74 | 48.10 | 6.39 |

*n = 2

Example 7

Materials and Methods

Experimental design. 60 female weaned piglets (Rongchang×Dabai crossbred) with an average weight of 9 kg were randomly assigned to 5 different groups. There were 3 replicates for each group with 4 piglets per replicate. The five groups were: 1) negative control (NC), 2) positive control (PC), 3) Toxfin Supreme (TS)1, 4) TS2 and 5) TS3. The NC group was fed clean (no ZEA contamination) basal diets without Toxfin Supreme; the PC group was fed ZEA contaminated diets (1 ppm) without Toxfin Supreme; and TS 1, TS2 and TS3 groups were fed ZEA contaminated diets (1 ppm) supplemented with 1, 2 and 3 g/kg Toxfin Supreme, respectively. All piglets were reared in floor pens and ad libitum access to feed and water. All piglets were fed basal diets for one week prior the start of the trial, so that they could adapt to the experimental environment.

Zearalenone contaminated feed preparation. The nutrient levels of the basal diets met NRC requirements (Table 14). About 800 kg of corn were stored in a room at 28 with 70% relative humidity for weeks to obtain moldy corn containing about 3 mg/kg ZEA. By adding moldy corn to replace normal corn in the basal diet, the concentration of zearalenone in all treatment diets was about 1 ppm (Table 14). Basal diets also contained very low concentration of ZEA (about 65 ppb). ZEA concentration of the five different diets was determined using the Zearalenone Assay Kits (Beacon Company).

TABLE 14

Experimental design and composition of diets

| Group | NC | PC | TS1 | TS2 | TS3 |
|---|---|---|---|---|---|
| Zearalenone (ppm) | 0.065 | 1.05 | 1.12 | 1.08 | 1.10 |
| Toxfin Supreme (g/kg) | 0 | 0 | 1 | 2 | 3 |
| Ingredients, % | | | | | |
| Corn | 53 | 53 | 53 | 53 | 53 |
| Wheat middling | 6.5 | 6.5 | 6.5 | 6.5 | 6.5 |
| Soybean | 24.76 | 24.76 | 24.76 | 24.76 | 24.76 |
| Wheat flour | 5 | 5 | 5 | 5 | 5 |
| Fish meal | 5.5 | 5.5 | 5.5 | 5.5 | 5.5 |
| Soybean oil | 2.5 | 2.5 | 2.5 | 2.5 | 2.5 |
| Lysine | 0.3 | 0.3 | 0.3 | 0.3 | 0.3 |
| Met | 0.1 | 0.1 | 0.1 | 0.1 | 0.1 |
| Thr | 0.8 | 0.8 | 0.8 | 0.8 | 0.8 |
| Dicalcium phosphate | 0.3 | 0.3 | 0.3 | 0.3 | 0.3 |
| Limestone | 0.2 | 0.2 | 0.2 | 0.2 | 0.2 |
| 1% premix | 1 | 1 | 1 | 1 | 1 |
| Salt | 1 | 1 | 1 | 1 | 1 |
| Composition of nutrients | | | | | |
| DE, KCal/kg | 3417 | 3417 | 3417 | 3417 | 3417 |
| Crude protein, % | 20 | 20 | 20 | 20 | 20 |
| Crude fat, % | 5.4 | 5.4 | 5.4 | 5.4 | 5.4 |
| Ca, % | 0.82 | 0.82 | 0.82 | 0.82 | 0.82 |
| P, % | 0.42 | 0.42 | 0.42 | 0.42 | 0.42 |

*Premix (weight/kg): Mn 40 mg, Fe 130 mg, Zn 130 mg, Cu 15 mg, I 0.35 mg, Se 0.3 mg, $V_A$ 11.025 IU, $V_{D3}$ 22.03 IU, $V_E$ 80 IU, $V_K$ 4.4 mg, $V_{B1}$ 4.4 mg, $V_{B2}$ 11 mg, pantothenic 35 mg, Nicotinic acid 59.5 mg, Chlorine 330 mg, Folic acid 0.9 mg, Biotin 0.5 mg and $V_{B12}$ 55 μg.

Growth performance. Body weights and feed consumption were recorded at day 1 and 42 to calculate average daily feed intake (ADFI), average daily weight gain (ADG) and feed conversion ratio (FCR).

Zearalenone binding efficacy test. ZEA was measured in feces, for which total feces of each group were collected and weighed at 21, 22, 23, 40, 41 and 42 days. After thorough homogenization, about 10% of total feces were stored at −20° C. for future analysis. During the same period, the feed consumption of each group was recorded to calculate the amount of ZEA consumed by piglets accurately. Toxfin Supreme binding efficacy on ZEA in vivo was expressed as a percentage, and calculated as the ratio of total zearalenone content in feces compared to total ZEA intake. Analysis of ZEA was performed according to the manual of the assay kit (Beacon Company).

Serum β-estradiol. At day 1, 21 and 42, three blood samples from each group were collected via the external pig tail vein. Analysis of serum β-estradiol was performed according to the manual of the assay kit (Jiancheng Biotechnology Institute, Nanjing, China).

Vulva Size Measurement. The vulva length and width of each piglet was measured using vernier caliper at day 1, 21 and 42. The vulva area was calculated according to the formula: area=(length×width/2).

Histological analysis. At the end of the experiment, 3 piglets from each group were euthanized. The ovaries and uterus were removed immediately and then fixed in Bouin's solution. They were then embedded in paraffin and sectioned at 5 μm. Sections were finally stained with hematoxylin and eosin (H&E) and the number of follicular and acinus cells were calculated. The histopathological examination was done under light microscopy by the experimental pathology laboratories (Department of Veterinary Sciences; Southwest University, Chongqing, China).

Statistical analysis. Data were subjected to Levene's homogeneity of variances test before the analysis for group differences. Data were processed by one-way analysis of variance (ANOVA) followed by Duncan's test using SPSS 16.0. Differences were considered to be significantly different at P<0.05.

Results

Growth performance. There were no differences in ADFI and FCR of piglets among all groups, and compared to the negative control group, the ADG of piglets significantly decreased in the PC group (Table 15). The addition of Toxfin Supreme in ZEA contaminated diets at 1, 2 and 3 g/kg all improved ADG of piglets and brought them back to same ADG as the negative control level (Table 15). Toxfin Supreme had no effect on ADFI and FCR, but helped in the recovery of ADG of piglets fed ZEA contaminated diets at all three concentrations.

TABLE 15

Growth performance of piglets fed with different diets

| Group | NC | PC | TS1 | TS2 | TS3 |
|---|---|---|---|---|---|
| ADG (kg/day) | $0.61 \pm 0.02^a$ | $0.56 \pm 0.02^b$ | $0.58 \pm 0.03^{ab}$ | $0.59 \pm 0.01^{ab}$ | $0.60 \pm 0.03^{ab}$ |
| ADFI (kg/day) | $1.29 \pm 0.09$ | $1.24 \pm 0.06$ | $1.29 \pm 0.10$ | $1.28 \pm 0.05$ | $1.34 \pm 0.11$ |
| FCR (g:g) | $2.13 \pm 0.12$ | $2.22 \pm 0.08$ | $2.21 \pm 0.09$ | $2.16 \pm 0.09$ | $2.24 \pm 0.10$ |

Note:
the values in the same row with different superscript letters differ significantly ($p < 0.05$)

In vivo ZEA binding efficacy of Toxfin Supreme. Fecal samples were collected and analyzed for presence of ZEA. In natural ZEA contaminated feed, about 35% of ZEA could be eliminate in feces (Table 16). Toxfin Supreme significantly increased binding capability to ZEA in a dose dependent manner, being 64% in TS 1, 77% in TS2 and 92% TS3 (Table 3).

TABLE 16

In vivo zearalenone binding efficacy of Toxfin Supreme (%)

| Time (day) | PC | TS1 | TS2 | TS3 |
|---|---|---|---|---|
| 21-23 | $35.45 \pm 2.66^a$ | $65.04 \pm 2.97^b$ | $77.86 \pm 6.97^c$ | $95.02 \pm 1.87^d$ |
| 40-42 | $36.04 \pm 1.83^a$ | $63.62 \pm 1.22^b$ | $76.18 \pm 4.80^c$ | $90.09 \pm 3.65^d$ |
| Average | $35.74 \pm 1.10^a$ | $64.32 \pm 1.52^b$ | $77.02 \pm 1.21^c$ | $92.55 \pm 3.08^d$ |

Note:
the values in the same row with different superscript letters differ significantly ($p < 0.05$)

$\beta$-estradiol concentration. At days 21 and 42, $\beta$-estradiol concentration in serum of the PC group was about 52% and 41% lower than the concentration found in the NC group (Table 17). These data showed that ZEA significantly decreased the estradiol secretion in weaned piglets. Compared to the PC, $\beta$-estradiol concentrations in Toxfin Supreme treated piglets group TS 1 (1 g/kg) increased but were still lower than those in the NC group (Table 17). $\beta$-estradiol concentration was significantly increased and reached NC levels in the Toxfin Supreme treated groups TS2 (2 g/kg) and TS3 (3 g/kg) (Table 4). Toxfin Supreme had a better efficacy as a ZEA binder when given at higher doses.

TABLE 17

Serum $\beta$-estradiol concentration of piglets at day 1, 21 and 42 (ng/L)

| Time (day) | NC | PC | TS1 | TS2 | TS3 |
|---|---|---|---|---|---|
| 1 | $21.59 \pm 4.46$ | $21.87 \pm 5.44$ | $20.96 \pm 3.99$ | $22.91 \pm 2.49$ | $21.69 \pm 3.02$ |
| 21 | $23.97 \pm 3.92^a$ | $12.46 \pm 0.84^c$ | $14.13 \pm 1.60^c$ | $18.20 \pm 1.94^b$ | $19.78 \pm 1.25^b$ |
| 42 | $28.67 \pm 5.7^a$ | $11.83 \pm 1.37^c$ | $17.90 \pm 2.28^b$ | $26.51 \pm 1.04^a$ | $23.81 \pm 1.56^a$ |

Note:
the values in the same row with different superscript letters differ significantly ($p < 0.05$)

Vulva size measurements. Vulva size of each piglet was monitored at day 1, 21 and 42. Vulva size in this trial was expressed as a percentage and was calculated as the ratio of vulva size at day 1 and 21, and day 1 and day 42 in each group. At both 21 and 42 days, the enlargements of vulva size in TS2 and TS3 group were significantly less than those of PC group and TS 1 group. The size of vulvas in TS3 group was similar to those of NC group (Table 18). Toxfin Supreme could alleviate ZEA induced vulva size enlargement at a dosage of 2, 3 g/kg (Table 18).

TABLE 18

Ratio of vulva area of piglets fed a ZEA contaminated diet between 1 and 21, 42 days of age (%)

| Time (day) | NC | PC | TS1 | TS2 | TS3 |
|---|---|---|---|---|---|
| 21 | $174.40 \pm 42.23^a$ | $412.55 \pm 64.35^c$ | $317.02 \pm 62.06^c$ | $252.07 \pm 43.85^b$ | $220.41 \pm 54.37^{ab}$ |
| 42 | $198.07 \pm 47.04^a$ | $478.36 \pm 62.04^c$ | $374.46 \pm 47.93^c$ | $296.75 \pm 53.69^{bc}$ | $240.40 \pm 50.94^{ab}$ |

Note:
the values in the same row with different superscript letters differ significantly ($p < 0.05$)

Histological analysis. Tissue samples from varies and uterus were observed through light microscopy and the relative amount of follicular and acinus cells for each group were recorded (Table 19). These results indicated that the number of acinus increased significantly in TS2 and TS3 group compared to those of PC group. Toxfin Supreme at a dosage of 2-3 g/kg alleviated the effects of ZEA on the development of sow's ovaries and uterus.

TABLE 19

Relative amount of follicular and acinus cells from ovaries and uterus from piglets' fed zearalenone contaminated diets (cells/cm$^2$)

| Group | NC | PC | TS1 | TS2 | TS3 |
|---|---|---|---|---|---|
| Folliculus | $5379 \pm 1185^a$ | $2832 \pm 766^b$ | $2657 \pm 564^b$ | $3859 \pm 890^{ab}$ | $3843 \pm 519^{ab}$ |
| Acinus | $1309 \pm 146^a$ | $542 \pm 37^b$ | $873 \pm 148^b$ | $1265 \pm 268^a$ | $1298 \pm 247^a$ |

Note:
the values in the same row with different superscript letters differ significantly ($p < 0.05$)

Discussion

In this experiment, ~1 ppm ZEA decreased ADG of piglets but had no significant effects on ADFI and FCR. The negative effects of mycotoxin adsorbents on depressing animal growth are always considered because adsorbent may also bind certain nutrients such as vitamins and minerals as it has been shown when evaluated in vitro (Tomasevic-Canovic M, Dakovic A, Markovic V. 2000. Adsorpton effects of mineral adsorbents; Part III: Adsorption behaviour in the presence of vitamin B6 and microelements. Acta Veterinaria, 50(1):23-30). In this study, Toxfin Supreme did not show negative effects on performance and even exhibited a slight improvement in ADG of piglets. It may be the concentration of minerals and vitamins in commercial animal feeds is relative enough and the dosage of absorbents added in feeds is very small.

Zearalenone is well known as a full agonist for estrogen receptors due to the very similar chemical structure to estradiol. One ppm ZEA caused obvious visual hyperestrogenism effects on female weaned piglets such as swelling of the vulva after 3-6 weeks exposure. Exposure to ZEA treated diets for 3 and 6 weeks, the excretion of estradiol was depressed significantly compared to those levels excreted through control piglets. The estradiol concentration in serum was recovered to normal levels when Toxfin Supreme was added into zearalenone contaminated diets at 2, 3 g/kg feed. As shown in this experiment, about 75-90% zearalenone intake by piglets was adsorbed by Toxfin Supreme (2-3 g/kg) and then eliminated through feces. This is why Toxfin Supreme may help improve estradiol excretion and may alleviate ZEA-induced clinical signs such as red and swelling of piglet vulva.

Example 8

Material and Methods

Experimental animals. Twenty-four-old day and mixed sex free-range broilers of a commercial strain (T44×SA51) were obtained from a commercial hatchery. They were individually weighed and randomly distributed to different wire-floored cages. The average initial weight was 417.35±45.26 g (mean of 200 birds) with a room temperature of 20±5° C., natural illumination and manual ventilation.

Feed formulation. Animals were fed a commercial, unmedicated, corn-soybean meal basal diet that contained or exceeded the levels of critical nutrients recommended by the National Research Council (1994). Feed ingredients used in formulating the control diet did not contain mycotoxins at detectable levels. The basal control diet was formulated as shown in Table 20.

TABLE 20

Feed ingredients used in formulating the basal diet.
Percentage composition of the basal diet (g/100 g).

| Ingredient | Percentage of diet (g/100 g) |
|---|---|
| Wheat | 50.00 |
| Soybean meal | 25.64 |
| Maize | 12.00 |
| Barley | 5.00 |
| Soybean oil | 1.00 |
| Dicalcium phosphate | 1.00 |
| Fish meal | 1.00 |
| Calcium carbonate | 0.90 |
| Animal fat | 2.00 |
| Salt | 0.25 |
| Sodium bicarbonate | 0.13 |
| *Vitamin/mineral premix | 0.40 |
| Methionine | 0.30 |
| Lysine | 0.30 |
| Threonine | 0.08 |
| Total | 100.00 |
| Approximate analysis | |
| Dry matter | 89.63 |
| Total protein | 19.30 |
| Ash | 5.20 |
| Fat | 5.00 |
| Fiber | 3.00 |
| Lysine | 1.13 |
| Methionine | 0.28 |
| Yeast and mold count (cfu/g) | $3.6 \times 10^3$ |

*Vit. A 12500 UI; Vit. D 33500 UI; tocopherols 4000 UI; Vit. K3 800 mg; folacin 200 mg; thiamine 600 mg; riboflavin 1800 mg; niacin 6000 mg; calcium panthothenate 2000 mg; pyridoxine 600 mg; cyanocobalimin 4 mg; biotin 8 mg; manganese 30,000 mg; zinc 20,000 mg; iodine 480 mg; cobalt 80 mg; selenium 40 mg; BHT 25,000 mg; anti-caking agent 6000 mg.

Diet preparation. The binders are commercial products sold by Kemin Europe N.V. under the trademarks Toxfin (coded as B1) and Toxfin Supreme (coded as B2); Toxfin is a blend of sepiolite and bentonite and Toxfin Supreme is a blend of leonardite and sepiolite. Four mycotoxigenic fungi cultures, containing Aflatoxin B1 (coded as AFB1), Fumonisin B1 (coded as FB1), Ochratoxin A (coded as OA) and T-2, were obtained from Kemin Europe N.V. The toxins were incorporated into the basal diet by mixing the appropriate quantities with 2 Kg diet and then mixed with the rest of the basal diet in a paddle feed mixer to produce the desired concentrations (Table 21). To test the efficacy of binders as dietary treatments for mycotoxicoses, the mycotoxin contaminated diet was supplemented with 3000 ppm of B1 and another diet supplemented with 3000 ppm of B2 (Table 21).

Binders were thoroughly shaken for 30 seconds by hand prior to dosing the feed and mixed the appropriate quantities with 2 Kg mycotoxin-contaminated diet and then mixed with the rest of contaminated diet in a paddle feed mixer to produce the desired treatments.

Different samples of the mycotoxin contaminated feed were analyzed before starting the trial to check final OA concentration by HPLC as an indicator of homogeneity.

Experimental design. Animals were randomly allocated to different treatment groups and housed in 4 cages (10 chickens per cage). Treatments were replicated five times. Individual boxes into cages contained a water trough and a feeder. The birds were allowed to acclimatize to the cages environment for 1 day before the commencement of the feeding trial. The animals were supplied feed and water ad libitum. Feed consumption was recorded daily for each cage. Animals were weighed at the end the week (28-day-old birds) and then they were euthanized by $CO_2$.

TABLE 21

Mycotoxins and binders levels contained in different experimental diets

|  | $FB_1$ | AFB1 | OA | T-2 | B1 | B2 |
|---|---|---|---|---|---|---|
| Amount Toxin Concentration | 989.47 1900 | 29.79 800 | 16.79 1400 | 11.85 1982.61 | 287.37 | 287.37 |
| Amount added to batches (g) | 329.83 | 9.79 | 5.60 | 3.95 | 95.80 | 95.80 |
| Final concentration in feed ||||||| 
| T1 | [1]BLD | BLD | BLD | BLD | BLD | BLD |
| T2 | 20 ppm | 250 ppb | 250 ppb | 250 ppb | 0 | 0 |
| T3 | 20 ppm | 250 ppb | 250 ppb | 250 ppb | 3000 ppm | 0 |
| T4 | 20 ppm | 250 ppb | 250 ppb | 250 ppb |  | 3000 ppm |

[1]BLD: below detectable limit

Collection of feces samples. Broilers were given ad libitum access to the control diet during 1-d adaptation to the cages followed by a 3-d test in each replicate. Each 5-d test period consisted of 1-d of adjustment, 3-d of experimental diet feeding, and 1-d for change-over; test diets were fed continuously during 3-d test period. After the morning feeding on the change-over day, fecal samples (approximately 400 g of wet feces per treatment) were collected from the stainless steel floor from behind animals, stored in plastic packs under refrigeration conditions and shipped to a certified laboratory for mycotoxin assay. The wet samples were immediately lyophilized after they were received by the laboratory.

Mycotoxin Quantification in Feces.

Samples of broiler feces. Excreta were collected as described in the experimental design section and sent to the laboratory in the same day. They were weighed (389.9±69.1 g) and lyophilized. Samples were re-weighed for moisture estimation and crushed-mixed with mortar and pestle. All samples were frozen and stored at −20° C. until required.

Apparatus and reagents. HPLC grade acetonitrile and methanol were purchased from Lab-Scan (Dublin, Ireland) and HPLC grade acetic acid from Merck (Darmstadt, Germany). Ultrapure water was obtained from a Milli-Q Plus apparatus from Millipore (Milford, Mass.). The immunoaffinity columns RIDA ochratoxin A were supplied by R-Biopharm AG (Glasgow, Scotland). Aflatoxin B1; fumonisin B1 and ochratoxin A standards were provided by Sigma (St. Louis, Mo.) and stock solutions (0.01 mg/ml) were prepared in methanol and stored at −21° C. Reagents for sodium bicarbonate buffer pH 8.1 (0.13 M) and PBS phosphate buffer saline pH 7.4 (20 mM) were provided by Panreac (Barcelona, Spain).

The LC system consisted of an Agilent Technologies 1100 high-performance liquid chromatogram coupled to an Agilent fluorescence detector at: (1) 365 nm (excitation) and 455 nm (emission) for aflatoxin B1; (2) 335 nm (excitation) and 440 nm (emission) for fumonisin B1; (3) 333 nm (excitation) and 460 nm (emission) for ochratoxin A. The LC column was Ace 5 C18, 250×4.6 mm, 5 μm particle size (Advanced Chromatography Technologies, Aberdeen, Scotland). The isocratic LC mobile phases were: (1) distilled water, acetonitrile and methanol (55:30:15 v/v/v); the flow rate: 1.2 ml/min for aflatoxin B1; (2) distilled water, acetonitrile and acetic acid (51:48:1 v/v/v); the flow rate: 1.2 ml/min for ochratoxin A; (3) distilled water, acetonitrile and acetic acid (53:46:1 v/v/v); the flow rate: 1.2 ml/min for fumonisin B1.

Analysis of Aflatoxin-B1, Ochratoxin-A and Fumonisin-B1 in broiler feces. The analytical method used in this trial has been previously described by Ariño et al., (2007) with some modifications. Briefly, (1) Aflatoxins-B1: 5 g of broiler feces was mixed with 25 ml methanol 70%; (2) Ochratoxin-A: 5 g of broiler feces was mixed with 20 ml methanol 70%; (3) Fumonisin-B1: 10 g of broiler feces was mixed with 20 ml methanol 75% using an homogenizer for 15 min. The extract was centrifuged at 3500 rpm during 15 min and filtrated by Whatman n° 1. The aflatoxin and ochratoxin filtrates were purified through the RIDA toxin immunoaffinity. Immunoaffinity cleanup was done according to the instructions of the manufacturer: equilibrate with 2 ml PBS/methanol (90/10), pass sample extract slowly and continuously through the column, rinse the column with 10 ml PBS/methanol (90/10), and eluate with 2 ml methanol. The different toxins eluates were collected into an opaque vial. The eluates were evaporated to dryness in a heating block under a gentle stream of nitrogen, and re-dissolved in the methanol:distilled water:acetic acid, (30:69:1 v/v/v)

The fumonisin filtrate was eluted in a SPE vacuum manifold (SAX 500 mg). The cartridges were previously conditioned with 5 ml of methanol 75% followed by 5 ml of distilled water at a flow rate of 1 ml/min, before loading 10 ml of the sample solution at a flow rate of 0.8 ml/min. Subsequently cartridges were washed methanol 75% followed by methanol 100%. Fumonisin hold in the cartridges were eluted in amber tubes containing acetic acid:methanol (1:99 v/v) and the eluate was evaporated to dryness in a heating block under a gentle stream of nitrogen, and re-dissolved in the injection solvents (acetonitrile:distilled water:acetic acid, 46:53:1, v/v/v).

Aflatoxins and fumonisins aliquots of 20 μl and ochratoxin aliquots of 100 μl were injected into the LC-FLD system. Identity of ochratoxin was chemically confirmed by methyl ester formation according to Li et al. (1998). Identity of aflatoxin and fumonisin was chemically confirmed according UNE-EN 14123 and UNE-EN 13585. The analytical method was validated in-house with respect to precision and recovery. The average recovery and relative standard deviation (RSDr, repeatability) obtained by the described method were 84% for OA; 75% for AFB1 and 90.6% for FB1, (RSD 5%, 5%, 3.8%, respectively). The performance characteristics were within the acceptable margins indicated in the Commission Regulation No. 401/2006 (EC, 2006). The study of sensitivity for aflatoxin, ochratoxin and fumonisin indicated that the limits of quantification (LOQ) were: 0.2 ng/g; 2 ng/g and 200 ng/g respectively.

Analysis T-2 toxin in broiler feces. The T-2 toxin was analyzed by ELISA technique (Ridascreen®). An amount of 5 g of broiler feces was mixed with 25 ml methanol 70% and homogenized (magnetic stirrer) for 10 min. The extract was centrifuged at 3500 rpm during 15 min and filtrated by Whatman n° 1. Total volumes of 50 µl of the extract were diluted with 950 µl of PBS buffer. Samples and the standards were used according to the manufacturers' instructions. The measurement was made photometrically at 450 nm and detection limit was <5 ppb (approx. 3.5 µg/kg).

Statistical analyses. All data were analyzed by ANOVA using the SPSS procedure (SPSS version 15.0; 2006). Treatment means with significant differences were ranked by Tukey's multiple range test. Pearson's correlation coefficients were calculated among variables. All statements of differences were based on significance at $p<0.05$.

Results

Clinical effects. At day 1, the excreta from all birds had a normal consistency. This condition began to change until day 3 except for control batch, when excreta began to be sticky and adhered to the wire mesh pen floors and around the area of the birds. Previous reports have associated diarrhea with fumonisin toxicity after 4-13 days infected fed. Sticky excreta from broilers fed *Fusarium*-infected corn has been reported; a depression in diet dry matter digestibility and diarrhea was associated with this phenomena. The data in the present study indicate qualitative description in the faeces consistency, however fecal moisture content at day 3 was not significantly different ($p>0.05$) among treatments (Table 22). These values are considered normal. No mortality was observed due to diets.

TABLE 22

Fecal moisture content in broilers fed different diets for 3 days

| | Moisture (%) |
|---|---|
| T1 (control) | 63.0 ± 11.0 |
| T2 (mycotoxins) | 64.0 ± 8.6 |
| T3 (mycotoxins + B1) | 61.6 ± 10.7 |
| T4 (mycotoxins + B2) | 65.0 ± 7.3 |

Values represent the x SD of five groups of ten broilers per treatment
Each value is a mean of five determinations Consumption and weight gain. Initial and final weights of birds fed experimental diets are presented in Table 23. There was no statistical difference in body weight. However, final weight of birds and feed intake fed the T2 diet (mycotoxin contaminated feed) were respectively 2% and 1% less than those of control batch ($p>0.05$). Conversely, birds fed binders showed higher final body weight and feed consumption than those birds of control batch ($p>0.05$).

TABLE 23

Influence of experimental diets on body weight and total feed intake of broilers fed for 3 days

| | Body Weight (g/bird) | | Total feed intake | [1]Change | Feed intake difference |
|---|---|---|---|---|---|
| | 24 day old | 28 day old | (g/10 birds; 3 d) | (%) | from control (%) |
| T1 | 415.9 ± 53.84 | 448.5 ± 65.5 | 1266.4 ± 139.8 | 0 | 0 |
| T2 | 416.7 ± 45.75 | 440.3 ± 58.7 | 1253.2 ± 119.8 | −2 | −1 |
| T3 | 418.0 ± 43.23 | 463.7 ± 53.9 | 1318.0 ± 121.3 | +3.4 | +4.1 |
| T4 | 418.7 ± 39.25 | 461.9 ± 68.5 | 1334.8 ± 177.7 | +3.0 | +5.4 |
| Sig (*) | NS | NS | NS | | |

(*) NS: no significant differences ($p > 0.05$)
Values represent the x ± SD of five groups of ten broilers per treatment
[1]Change = percentage change in body weight relative to controls Mycotoxins in excreta. Table 24 shows different toxin concentrations in the excreta of birds after 3 days of feeding experimental diets. Results showed aflatoxin B1 concentration in excreta of birds fed B1 was 66% significantly higher ($p<0.05$) than birds fed T2 diet. Aflatoxin B1 concentration in excreta of birds fed B2 was 26% significantly higher ($p<0.05$) than those birds fed T2 diet. Fumonisin B1 concentration in excreta of bird fed B1 and B2 were respectively 52% and 8% higher to birds fed T2 diet. Although the precise mode of action of binders (B1 and B2) is not known, we hypothesized that binders might partially trap the aflatoxin and fumonisin molecules in its matrix preventing a partial aflatoxin and fumonisin absorption from the gastrointestinal tract. So, B1 and B2 administered concomitantly with a pool of mycotoxins were shown to adsorb AFB1 and FB1, thereby limiting AFB1 and FB1 bioavailability and increasing excretion in birds. However, binders had no effect on ochratoxin A and T-2 toxin excretion after 3 days of diet exposure. T-2 toxin and OA toxic effects have not been found to be reduced by any sorbent up to now (Kubena et al., 1990; Huff, W. E., L. F. Kubena, R. B. Harvey, and T. D. Phillips. Efficacy of hydrated sodium calcium aluminosilicate to reduce the individual and combined toxicity of aflatoxin and ochratoxin A. Poult. Sci. 71: 64-69. 1992; Bailey, R. H., L. F. Kubena, R. B. Harvey, S. A. (1998). Buckley, and G. E. Rottinghaus. Efficacy of various; sorbents to reduce the toxicity of aflatoxin and T-2 toxin; in broiler chickens. Poult. Sci. 77:1623-1630; García, A. R.; Avila, E.; Rosiles, R.; Petrone, V. M. (2003). Evaluation of two mycotoxin binders to reduce toxicity of broiler diets containing Ochratoxin A and T-2 toxin Contaminated Grain. Avian Diseases 47:691-699).

New binding products have appeared in an attempt to counteract mycotoxins (Hoerr, F. J., W. W. Carlton, J. Tuite, R. F. Vesonder, W. K. Rohwedder, and G. Szigeti. Experimental thricothecene mycotoxicosis produced in broiler chickens by *Fusarium* sporotrichiella var. *sporotrichioides*. Avian Pathol. 11:385-405. 1982; Devegowda, G., and M. V. L. N. Raju. Influence of esterified-glucomannan on performance and organ morphology, serum biochemistry and haematology in broilers exposed to individual and combined mycotoxicosis (aflatoxin, ochratoxin and T-2 toxin). Br. Poult. Sci. 41:640-650. 2000); however, they have not been properly evaluated since most of them have only received in vitro evaluation, which does not provide reliable information about the sorbent activity under field conditions. This has to be considered not only in a sorbent evaluation process, but also in the source of mycotoxin, because many evaluations have consisted of pure mycotoxin added to feed. Under realistic conditions, the contaminated grain includes many other metabolites, most of them unidentified, which definitively have effects on birds. Different research have emphasized the differences between the toxic effects observed in birds fed pure mycotoxin contaminated diets and those fed diets contaminated with mycotoxigenic fungi cultures (Hoerr et al., 1982; Rotter, R. G., A. A. Frohlich, R. R. Marquardt, and D. Abramson. Comparison of the effects of toxin-free and toxin containing mold contaminated barley on chick performance. Can. J. Anim. Sci. 69:247-259. 1989). At present, however, the utilization of mycotoxin-binding adsorbents is the most applied way of protecting animals against the harmful effects of decontaminated feed. So far, no single adsorbent was tested to be effective against most types of mycotoxins. However, the addition of different adsorbents to animal feed provides versatile tools of preventing mycotoxicosis.

TABLE 24

Mycotoxin concentration in feces detected by HPLC[1] after 3 days of diet exposure. (results expressed as ng/g of lyophilized feces)

|  | T1 | T2 | T3 | T4 | Sig (*) |
|---|---|---|---|---|---|
| Aflatoxin $B_1$ (ppb) | BDL[2] | $18.8^a \pm 2.6$ | $23.7^b \pm 1.9$ | $20.4^{ab} \pm 2.8$ | * |
| Ochratoxin A (ppb) | BDL | $55.0 \pm 17.7$ | $51.7 \pm 4.0$ | $60.0 \pm 10.4$ | NS |
| Fumonisin $B_1$ (ppb) | BDL | $545.8^a \pm 207.1$ | $910.0^b \pm 98.4$ | $823.5^{ab} \pm 119.0$ | * |
| T-2 (ppb) | BDL | $115.6 \pm 4.4$ | $123.8 \pm 19.0$ | $105.2 \pm 18.8$ | NS |

Each value is a mean of five determinations + SD
File values with different superscripts are significantly different
[1]HPLC was used to determine mycotoxins, except for T-2 which was confirmed by ELISA
[2]BLD means below detectable limit Conclusions The results obtained in our study indicated that feed consumption was not affected by dietary inclusion of mycotoxin contaminated diets (p>0.05) after 3 days of exposure. Supplementation with binders did not have any effect on feed consumption and weight gain.

B1 and B2 administered concomitantly with pool of mycotoxins were shown to adsorb effectively AFB1 and FB1, thereby limiting AFB1 and FB1 bioavailability and increasing excretion in birds.

Example 9

Material and Methods
Animals and Feeding.

In experimental design 60 gilts (Topigs) were housed in individual pens adjacent to each other in the same shed in groups of 15 animals. Gilts were allowed ad libitum access to food and water. Ingredients composition is shown in Table 25.

TABLE 25

Composition of diets used to determine the effect of adsorbents on zearalenone toxicosis in prepubertal gilts

|  | Control | ZEA | ZEA + NT | ZEA + ET |
|---|---|---|---|---|
| Pure Zearalenone (ppm) | 0.02 | 1.03 | 1.14 | 1.05 |
| Vomitoxine (ppm) | 0.30 | 0.31 | 0.36 | 0.27 |
| NT (ppm) | 0 | 0 | 3000 | 0 |
| ET (ppm) | 0 | 0 | 0 | 3000 |
| Ingredient | Percentage of diet[a] | | | |
| Barley | 35.00 | 36.00 | 35.50 | 34.00 |
| Wheat | 32.53 | 33.00 | 31.50 | 34.00 |
| Soybean (FF Danex) | 7.97 | 7.97 | 7.97 | 34.20 |
| Soybean (47/5 Brasil) | 11.00 | 11.05 | 12.00 | 11.30 |
| Sugar beet pulp 8/7.5 | 2.00 | 3.00 | 2.00 | 2.50 |
| Fat | 2.30 | 2.26 | 2.34 | 2.36 |
| Treonine | 0.00 | 0.00 | 0.00 | 0.00 |
| Tryptophan | 0.02 | 0.02 | 0.03 | 0.02 |
| Lysine 50% Liquid | 0.05 | 0.05 | 0.05 | 0.04 |
| Dicalcium phosphate sa | 0.20 | 0.20 | 0.20 | 0.20 |
| Vitazym 02 | 0.10 | 0.10 | 0.10 | 0.10 |
| Salbiotic | 0.30 | 0.30 | 0.30 | 0.30 |
| Visp vitaprotein 50 pl | 2.50 | 2.50 | 2.50 | 2.50 |
| Vitapops | 6.00 | 6.00 | 6.00 | 6.00 |
| Proximate analysis (%)[b] | | | | |
| Moisture | 9.76 | 9.98 | 9.83 | 9.93 |
| Protein | 18.73 | 18.18 | 18.59 | 18.32 |
| Fiber | 4.33 | 4.45 | 4.43 | 4.20 |
| Fat | 6.81 | 6.51 | 6.65 | 6.72 |
| Ash | 5.45 | 5.33 | 5.56 | 5.54 |
| Strach | 39.08 | 40.21 | 39.79 | 39.66 |

[a]Percentages expressed on dry matter.
[b]The subset percentages do not always add up to 100% because not all components were determined The pure toxin and the commercially available adsorbents, sold under the trademark Toxfin (coded as NT) and Toxfin Supreme (coded as ET), were supplied by Kemin Europe N.V.; Toxfin is a blend of bentonite and sepiolite and Toxfin Supreme is a blend of sepiolite and leonardite, a mineraloid high in humic substances. They were included into the experimentally contaminated diet which resulted in a dietary ZEA concentration of approximately 1 ppm. The control diet contained 0.02 ppm of ZEA (from raw materials) and any adsorbent (Table 25). The ZEA+NT and ZEA+ET diets contained approximately 1 ppm of ZEA and 3000 ppm of NT and ET, respectively. Different diets were fed to piglets during 6 weeks. Total feed intake was recorded for the duration of trial. From the performance data, daily gain (kg/day), daily feed intake (kg/day), and feed efficiency (gain/fed intake) describing the entire test period were calculated.

Determination of Zearalenone in Feed.

An AOAC-approved method for the determination of zearalenone in feed samples by HPLC and TLC was used (Scott, P. M., T. Panalalrs, S. Kanhcre and W. F. Miles. 1978. Determination of zearalenone in cornflakes and other com-based foods by thin layer chromatography, high matography/high resolution mass spectrometry. I.AOAC 61593). For calculating the values of zearalenone, duplicate determinations were evaluated from 10 different mixings of feed.

Clinical Evaluation.

All prepubertal gilts were observed weekly for signs of hyperestrogenism. Vulvas were assessed for swelling, redness and enlargement characteristics of estrogenic stimulation using a subjective 5 point scale (1=least stimulated; 5=most stimulated scale).

All gilts tested were apparently healthy with no signs of clinical infection. Respiratory and heart rate were normal. Mammary glands, vulva, mucosal, feces and urine aspect were normal.

Using serology test, the piglets were classified as negative for all major piglet pathogens except for Circovirus. Results were not available in this study but certified by the farm of the origin.

Blood Samples.

Blood was collected via the external pigtail vein into a tube containing EDTA anti-coagulant for hematology and another tube without EDTA for biochemical analysis. Blood collection was performed at the 0, $3^{rd}$ and $6^{th}$ week and coincided with the weighing of animals. Analyses were performed immediately after blood collection. A fraction of the blood collected in dried tube was centrifuged at 2000 g for 15 min at room temperature. The serum yield was transferred into Eppendorf tubes and used for some biological parameters. Blood cell count and routine hematological analysis were performed using an automated cell counter, with adapted dilution. Determinations enzymatic activity were achieved in duplicates and results expressed in International Units/Liter (IU/L).

Estradiol-17-β (E2).

Serum estradiol-17-β (E2) concentrations were determined by a solid-phase, competitive chemiluminescent enzyme immunoassay (Immullite®). The solid phase (bead) is coated with rabbit anti-estradiol plyclonal antibody validated previously. The reagent contains alkaline phosphatase (bovine calf intestine) conjugated to estradiol. The estradiol enzyme conjugate competes with estradiol in the sample for limited antibody-binding sites on the bead. The excess sample and reagent are removed by a centrifugal wash. Finally chemiluminiscent substrate is added to the bead and signal is generated in proportion to the bound enzyme. Results were expressed in pg/ml and the analytical sensitivity was 15 pg/ml.

Urine and Feces Samples.

Six animal of each pen were placed in individual metabolism cages in a room at 27±2° C. for 20 consecutive days; 1 week of adaptation to cages and 4 weeks (4 days per week) for daily records of consumption and fecal and urinary collection. At the end of about 12 hours the animals were removed in turns of three from the cages and returned to the pens. Samples were taken daily. The feces and urine collection was about 10% of total excretion. Samples were frozen and sent by transport to a laboratory to determine the presence of metabolites derived from ZEA.

Slaughter.

After 3 weeks of diet-exposure, 5 piglets of each treatment pen were slaughtered on the same day, in the same slaughterhouse, located less than 50 km from the farm, in commercial terms, according to European standards. Animals were stunned with CO and subsequently exsanguinated. Uterus, kidneys and liver were excised and weighed. Approximately 25 g of fresh liver and kidney were place into a formalin flask. Immediately after sacrifice, the reproductive organ was retrieved, identified and placed individually in phosphate-buffered saline (PBS, Sigma-Aldrich, Madrid) to avoid drying of the structures for subsequent evaluation. About 5 ml of bile of each slaughtered animal were collected into a tube to analyze ZEA concentration for better ZEA degradation understanding. Bile tubes were sent by transport to the laboratory in refrigeration conditions. All samples were stored and transported in coolers to different laboratories. After 6 weeks, all the remaining animals were slaughtered and samples were taken in the same conditions described above. Carcasses were seized and properly destroyed.

Histopathology Examination.

Each female was examined for gross anomalies on selected organs (liver, kidneys, ovaries and uterus). The organs were weighed and measured. The macroscopic, microscopic, and morphometric aspects were valued. Selected tissues and all gross lesions were fixed in 10% neutral buffered formalin, embedded in paraffin, sectioned at 3-5 μm, stained with hematoxylin and eosin, and examined by light microscopy. The histopathological examination of the fixed tissues was done by a university pathology laboratory.

Data Analysis.

Two-way analysis of variance was performed on blood parameters, ovary, oviduct, cervix, uterine horns weight and vagina, ovary, oviduct, cervix, uterine horns size. The factors or independent variables considered in this analysis were treatment (four levels: no ZEA added, 1 ppm ZEA, 1 ppm ZEA+3000 ppm NT and 1 ppm ZEA+3000 ppm ET) and time (two levels: 3 and 6 weeks of exposure). The treatment×time interactions were used to determinate whether time has any significant effect on Zeralenone/adsorbents toxicosis effect. Differences among treatments or time exposure were analyzed by Student's t-test. Chi-square test was used in order to measure the association among categorical variables of the study. All of the statistical analyses were performed with SPSS (Statistical Package for the Social Science for Windows, version 15.0, 2006).

Results

Weight Gain, Feed Consumption and Feed Efficiency of Animals.

TABLE 26

Mean and standard deviation of gilt weight evolution.

| Time (weeks) | Weight (kg) | | | | |
| --- | --- | --- | --- | --- | --- |
| | Control | ZEA | ZEA + NT | ZEA + ET | Sig (*) |
| 0 | 16.96 ± 0.98 | 16.36 ± 1.4 | 16.18 ± 1.98 | 15.53 ± 1.92 | NS |
| 3 | 27.7 ± 2.12 | 26.07 ± 2.28 | 26.61 ± 2.04 | 25.38 ± 1.83 | NS |
| 6 | 34.4 ± 2.29 | 36.2 ± 2.69 | 36.38 ± 1.79 | 34.4 ± 3.68 | NS |

(*) NS = Not significant

TABLE 27

Summary of productivity traits in different batches.

|  | Control | ZEA | ZEA + NT | ZEA + ET | Sig (*) |
|---|---|---|---|---|---|
| Daily feed intake (kg/day) | 1.08 ± 0.09 | 1.20 ± 0.02 | 1.01 ± 0.04 | 1.05 ± 0.11 | NS |
| Food efficiency (gain/feed intake; kg/kg) | 2.16 ± 0.383 | 2.09 ± 0.194 | 1.74 ± 0.256 | 1.90 ± 0.651 | NS |
| Daily gain (kg/day) | 0.593 ± 0.11 | 0.589 ± 0.12 | 0.595 ± 0.14 | 0.598 ± 0.09 | NS |
| Oral ZEA intake (mg/day per animal) | 0.02 ± 0.001a | 1.23 ± 0.01b | 1.15 ± 0.03b | 1.10 ± 0.01b | *** |

(*) NS = Not significant (p > 0.05);
*** (p < 0.001)

Neither Zearalenone nor adsorbents had any effect on weight gain of gilts (Table 26). There were no differences neither feed consumption nor feed efficiency (Table 27). There were no differences among ZEA-treated gilts for oral ZEA intake. These data support the findings of James and Smith (James, L. J.; Smith, T. K. (1982). Effect of dietary alfalfa on Zearalenone toxicity and metabolism in rats and swine. Journal of Animal Science, 55:110-118) who noted that in swine, ZEA had no significant effect on growth characteristics.

Clinical Effects.

Within 3 weeks after diet-exposure to experimental diets, vulva scores increased. ZEA contaminated diets produced vulva scores greater than those of controls (FIG. 1). Enlargement increased in the following significantly order: ZEA≥ZEA+NT>ZEA+ET ≥CON. Within 6 weeks of diet-exposure, effects were greater intensity to those observed at week 3 (Table 28). Results demonstrated that ET and NT did not alleviate all ZEA clinical effects but ET adsorbent was found to be more effective.

TABLE 28

Mean and standard deviation of vulva size of gilts after 6 weeks of different diet-exposure.

| 6 weeks | Control | ZEA | ZEA + NT | ZEA + ET | Sig (*) |
|---|---|---|---|---|---|
| Vulva size (cm) | 1.45 ± 0.28$^a$ | 3.12 ± 0.52$^c$ | 2.81 ± 0.41$^{bc}$ | 2.48 ± 0.30$^b$ | *** |

(*) $^{a-c}$Within a row, value with a superscript letter was significantly different (p ≤ 0.001)

Blood Analysis Results.

The metabolism of ZEA seems to occur essentially in the liver leading to α and β zearalenol, the latter being nontoxic.

TABLE 29

Mean and standard deviation of blood parameters on day 0.

| Time (0 days) | Control | ZEA | ZEA + NT | ZEA + ET | Sig (*) |
|---|---|---|---|---|---|
| Leucocytes (count/mm$^3$) | 24500 ± 2072 | 19920 ± 2072 | 19249 ± 2072 | 20939 ± 2072 | NS |
| ALP (IU/liter$^†$) | 1002 ± 83 | 845 ± 83 | 895 ± 83 | 956 ± 85 | NS |
| GGT (IU/liter) | 57 ± 8 | 59 ± 8 | 74 ± 8 | 73 ± 8 | NS |
| ALT ((IU/liter) | 70 ± 6 | 65 ± 6 | 64 ± 6 | 56 ± 6 | NS |
| AST (IU/liter) | 119 ± 62 | 181 ± 62 | 159 ± 62 | 213 ± 64 | NS |
| Estradiol-17-β (pg/ml) | 23 ± 2 | 26 ± 2 | 21 ± 2 | 21 ± 2 | NS |
| Time*Treatment |  |  |  |  | NS |

(*) NS = Not significant.
$^†$ALP: alkaline phosphatase; GGT: γ-glutamyltransferase; ALT: alanine aminotransferase; AST: aspartate aminotransferase In order to get a general view on the toxicology of zearalenone, mainly liver, kidney and reproductive organ toxicity, other possible adverse effects on blood enzymes or biological markers have been investigated after 3 and 6 weeks of exposure.

No differences were observed for blood parameters among animals at the beginning of the studio, which indicated the same healthy status for different batches (Table 29). However, ALP and AST activity of all batches were over reference value (ALP≤300 IU/L; AST≤80 IU/L). GGT activity was not significantly different among treatments but adsorbent-treated gilts showed the higher values (p<0.05).

Table 30 shows the influence of treatments on the haematological parameters in prepubertal gilts after 3 weeks of ZEA and adsorbents diet exposure. In the ZEA and ZEA+NT-treated gilts, the ALP activity was significantly lower than in control and ZEA+ET batches. As also shown in Table 30, adsorbent-treated prepubertal swine had higher GGT activities than their non treated counterparts. No differences were found in any other blood parameters among batches.

Figure 2:
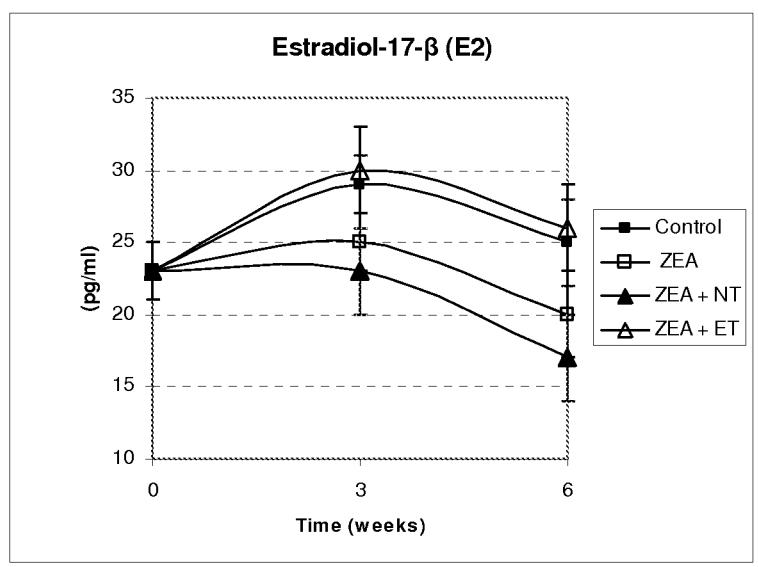
FIG. 2 is a chart of the evolution of average estradiol-17β plasma concentration for different batches.

ET>ZEA=ZEA+NT. These results could suggest that ET binds effectively to zearalenone and then mean plasma estradiol concentration were similar to control group, indicating basal levels of endogenous estradiol production for prepubertal gilts was maintained by ET-supplementation after 6 weeks of exposure. It was found similar evolution for E2 plasma concentration in all batches (FIG. 2). There was surge of E2 at week 3 and returned to basal levels at week 6. The slight E2 plasma concentration increase found in CON and ZEA+ET was not different (p>0.05) to basal levels whereas it was different to ZEA and ZEA+NT due to the significant E2 decrease at week 6. The results indicated that the hormonal profiles during the pubertal phase of gilts were modified by zearalenone in diet. In fact, maturation of hypothalamo-hypophysial responsiveness to estradiol, culminating in the ability to produce a preovulatory LH surge, occurs during the prepubertal period. The hypothalamo-hypophysial unit is sensitive to estrogens long before puberty occurs. For example, as early as 40 days of age, LH increased in serum after estradiol benzoate (EB), but the pattern was one of

TABLE 30

Mean and standard deviation of blood parameters after 3 weeks of different diet-exposure.

| Time (3 weeks) | Control | ZEA | ZEA + NT | ZEA + ET | Sig (*) |
|---|---|---|---|---|---|
| Leucocytes (count/mm$^3$) | 9854 ± 1346 | 13320 ± 1300 | 11719 ± 1346 | 12695 ± 1300 | NS |
| ALP (IU/l$^†$) | 954 ± 47$^c$ | 790 ± 45$^{ab}$ | 760 ± 51$^a$ | 929 ± 64$^{bc}$ | * |
| GGT (IU/l) | 78 ± 10$^{ab}$ | 56 ± 9$^a$ | 96 ± 11$^b$ | 107 ± 13$^b$ | * |
| ALT (IU/l) | 63 ± 4 | 55 ± 4 | 53 ± 4 | 50 ± 5 | NS |
| AST (IU/l) | 100 ± 8 | 79 ± 8 | 90 ± 9 | 91 ± 11 | NS |
| Estradiol-17-β (pg/ml) | 29 ± 2 | 25 ± 2 | 23 ± 3 | 30 ± 3 | NS |
| Time*Treatment | | | | | NS |

(*) $^{a-b}$Within a row, value with a superscript letter was significantly different (p ≤ 0.01);
NS = Not significant.
$^†$ALP: alkaline phosphatase; GGT: γ-glutamyltransferase; ALT: alanine aminotransferase; AST: aspartate aminotransferase ALP activity was significantly higher (p<0.05) in control batch after 6 weeks of exposure (Table 31). GGT activity was not significantly different among batches but adsorbents-treated prepubertal swine showed the higher values again. The ALP and GGT differences found from 3 to week 6, may suggest that there is a biological variation to recover from stress among and within groups.

multiple small surges that were less synchronous and lower in magnitude than in 160-days-old gilts (Fleming, M. W. and R. A. Dailey. 1985. Longitudinal study of the surge of gonadotropins induced by exogenous hormones in prepuberal gilts. Endocrinology 116:1893). Dial et al. (Dial, G. D., O. K. Dial, R. S. Wkinson and P. J. Dziuk. 1984. Endocrine and ovulatory response of the gilt to exogenous gonadotropins and estradiol

TABLE 31

Mean and standard deviation of blood parameters after 6 weeks of different diet-exposure.

| Time (6 weeks) | Control | ZEA | ZEA + NT ® | ZEA + ET ® | Sig (*) |
|---|---|---|---|---|---|
| Leucocytes (count/mm$^3$) | 3921 ± 665 | 3839 ± 665 | 4829 ± 743 | 3920 ± 665 | NS |
| ALP (IU/l$^†$) | 1093 ± 66$^b$ | 688 ± 66$^a$ | 683 ± 69$^a$ | 830 ± 66$^a$ | * |
| GGT (IU/l) | 64 ± 11 | 46 ± 11 | 56 ± 11 | 66 ± 11 | NS |
| ALT (IU/l) | 63± | 52 ± 6 | 63 ± 7 | 46 ± 6 | NS |
| AST (IU/l) | 63 ± 7 | 63 ± 7 | 77 ± 8 | 67 ± 7 | NS |
| Estradiol-17-β (pg/ml) | 25 ± 3$^b$ | 20 ± 3$^a$ | 17 ± 3$^a$ | 26 ± 3$^b$ | * |
| Time*Treatment | | | | | NS |

(*) $^{a-b}$Within a row, value with a superscript letter was significantly different
** (p < 0.01);
*** (p < 0.001);
NS = Not significant
$^†$ALP: alkaline phosphatase; GGT: γ-glutamyltransferase; ALT: alanine aminotransferase; AST: aspartate aminotransferase Concerning ZEA, dietary concentrations of 1 ppm for 6 weeks of exposure did not impair liver function and disturb blood parameters in our experiments.

Table 31 shows estradiol-17-β plasma (E2) concentration differences (p<0.05) at week 6. From high to E2 low plasma concentration, the order batch was: CON=ZEA+ during sexual maturation. Biol. Reprod. 30:289) reported that by 175 days of age, a single surge in LH similar to that of a mature sow occurred in response to EB, but at younger ages results were similar to those of Fleming and Dailey (1985). Because zearalenone affects some estrogen target tissues, exposure to zearalenone prior to puberty potentially could alter estrogen-sensitive mechanisms involved in maturation of the hypothalamus and the basal E2 concentration in plasma.

TABLE 32

Time effect of diet exposure on blood parameters for different batches.

| | Control | ZEA | ZEA + NT | ZEA + ET |
|---|---|---|---|---|
| Leucocytes (count/mm$^3$) | *** | *** | *** | *** |
| ALP (IU/l$^\dagger$) | NS | NS | NS | NS |
| GGT (IU/l) | NS | NS | * | * |
| ALT (IU/l) | NS | NS | NS | NS |
| AST (IU/l) | ** | ** | * | * |
| Estradiol-17-β (pg/ml) | NS | * | * | NS |

* ($p < 0.05$);
** ($p < 0.01$);
*** ($p < 0.001$);
NS = Not significant ($p > 0.05$)
$^\dagger$ALP: alkaline phosphatase; GGT: γ-glutamyltransferase; ALT: alanine aminotransferase; AST: aspartate aminotransferase Table 32 shows the influence of diet-exposure on blood parameters and liver enzymes within batch. Although the leukocyte counts is within the reference interval from initial to week 3, it was found a very significant decrease ($p<0.001$). After 6 weeks of exposure leukocyte counts was under reference interval ($p<0.001$) because of a severe lymphopenia for all batches (data not shown). Destruction of lymphoid cells could suggest infection agents, but animals showed no other signs of disease. Moreover, neutrophilia was found (data not shown) which suggests stress signs. The activity of ALP did not change in any batch during 6 weeks and the high level ALP activity demonstrated that all batches had the same amount of stress. AST and GGT remained high in all groups of animals during 3 weeks (not significant differences; $p>0.05$) but both decreased significantly to week 6 ($p<0.05$). Hong Yu et al., (Hong Yu, VMD; En-dong Bao, PhD; Ru-qian Zhao, PhD; Qiong-xia Lv, VMD. (2007). Effect of transportation stress on heat shock protein 70 concentration and mRNA expression in heart and kidney tissues and serum enzyme activities and hormone concentrations of pigs. November 2007, Vol. 68, No. 11, Pages 1145-1150) observed that a severe stress on pigs could manifest as increased serum activities of AST.

Anatomical and Pathological Lesions.

Figure 5:
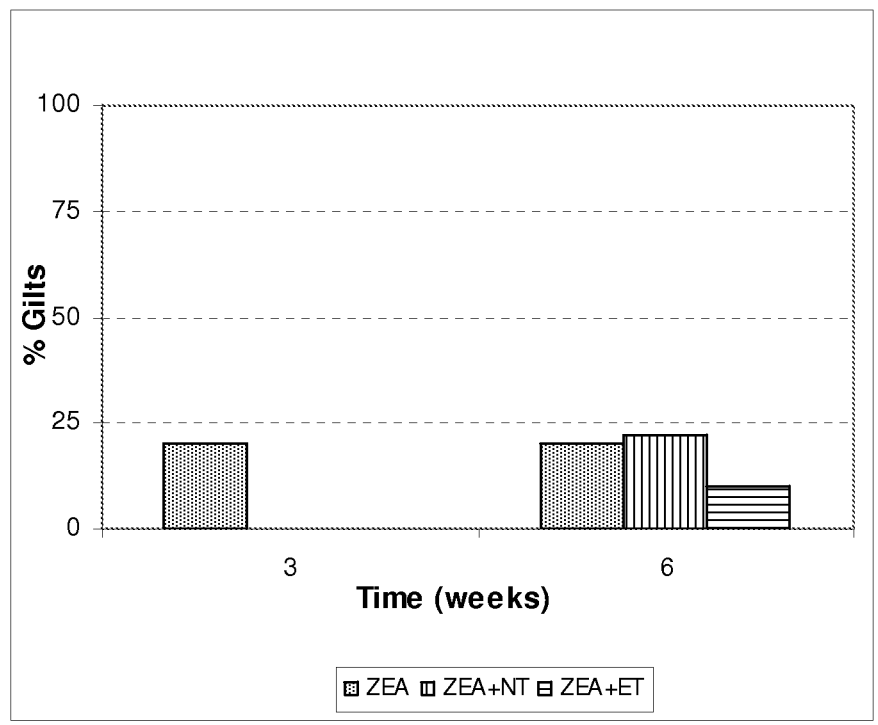
FIG. 5 is a chart of the percentage of gilts having hypoplasic ovary and follicules >6 mm in size.

Table 33 shows ZEA contaminated diets produced an increase on vagina weight ($p<0.05$) after 3 weeks of exposure. NT and ET-batches had similar vagina weight to ZEA group. Kurtz et al., (Kurtz. H. J., M. E. Naim, G. H. Nelson, C. M. Christensen and C. J. Mirocha. 1969. Histologic changes in the genital tracts of swine fed estrogenic mycotoxin. Am. J. Vet. Res. 30551) observed metaplasia of the epithelium in the cervix and vagina of 6-week-old pre-pubertal gilts fed ZEA (1 mg/day per animal for 8 days) which could explain our results. It was also observed that a 20% of the ZEA-treated gilts had follicules >6 mm in size and hypoplasic ovary (FIG. 5). Perhaps the estrogenic stimulation of ZEA was so strong that even the hypoplasic ovaries responded to the ZEA effects. No follicules >6 mm in size and hypoplasic ovary were found for the rest of the batches. ZEA and NT-treated batches had the highest percentages of hypoplastic ovaries ($p>0.05$) (Table 36). It was noticed that hypoplasic and ovulated ovaries were only observed in some gilts of ZEA batch (25%).

After 6 weeks of exposure, the pathological results were significantly different among batches. These differences were (Table 34):

Oviduct weight: ZEA≥ZEA+NT≈ZEA+ET>CON
Weight and size of uterine horns: ZEA=ZEA+NT≥ZEA+ET>CON
Cervix weight: ZEA+ET≥ZEA+NT≥ZEA≥CON
Vagina weight: ZEA=ZEA+NT>ZEA+ET>CON
Vagina size: ZEA=CON=ZEA+NT>ZEA+ET
Reproductive organ weight (oviduct-cervix): ZEA=ZEA+NT≈ZEA+ET>CON It was also found organ weight differences: there were not significant differences among ZEA, ZEA+NT and ZEA+ET butches but, they were overall significantly higher than control batch. These results demonstrated the inclusion of ZEA in the diet caused an over-growth reproductive organ after 6 weeks of exposure ($p<0.01$). Nevertheless, the addition of ET in diet showed the lowest reproductive weight within ZEA treatments. Table 34 shows hyperestrogenic symptoms caused by ZEA exposure at week 6. Different reproductive elements enlarged and gained weight when ZEA exposure. In most cases, enlargement and weight gain of ZEA and NT-treated batches were significantly different to control and ET-treated gilts. As expected, ZEA treated gilts showed the highest values, and control batch the lowest ones. NT and ET provided a partial toxic sparing effect of ZEA. Furthermore, 20% of the ZEA; 22% of NT and 10% of ET-treated gilts had follicules >6 mm in size and hypoplasic ovary growth (FIG. 5), but no cases were found in control.

Table 37 showed histopathological lesions of different organs after 6 weeks of diet-exposure. All ET-treated gilts had pyelitis (60% moderate and 40% severe) and it was significantly higher ($p<0.05$) to the other groups of animals. Liver lesions such as interstitial hepatitis and connective tissue increment were significantly lower to control batch ($p<0.05$) which demonstrated ZEA-diet exposure produced a liver toxicity characteristics. Neither NT nor ET supplementation minimized the hepatotoxicity. It was also found high percentage of mononuclear colangiohepatitis cases in gilts of all batches (Table 37), included control one. Because of high ALP activity during the trial, colangiohepatitis might be the result of a long period of stress exposure.

Table 35 shows the time effect of diet-exposure on reproductive organ structures within batches. A significant reproductive organ weight increase was found for all batches. An increase of control batch indicated a physiological growth. Observed reproductive organ structure growth and enlargement pattern were similar for ZEA and NT-treated batches and different to ZEA+ET and control batches. ET-treated and control batches had nearly similar pattern growth during the trial. These data demonstrate that ET overcame ZEA hyperestrogenims symptoms more efficiently than did NT.

Figure 3:
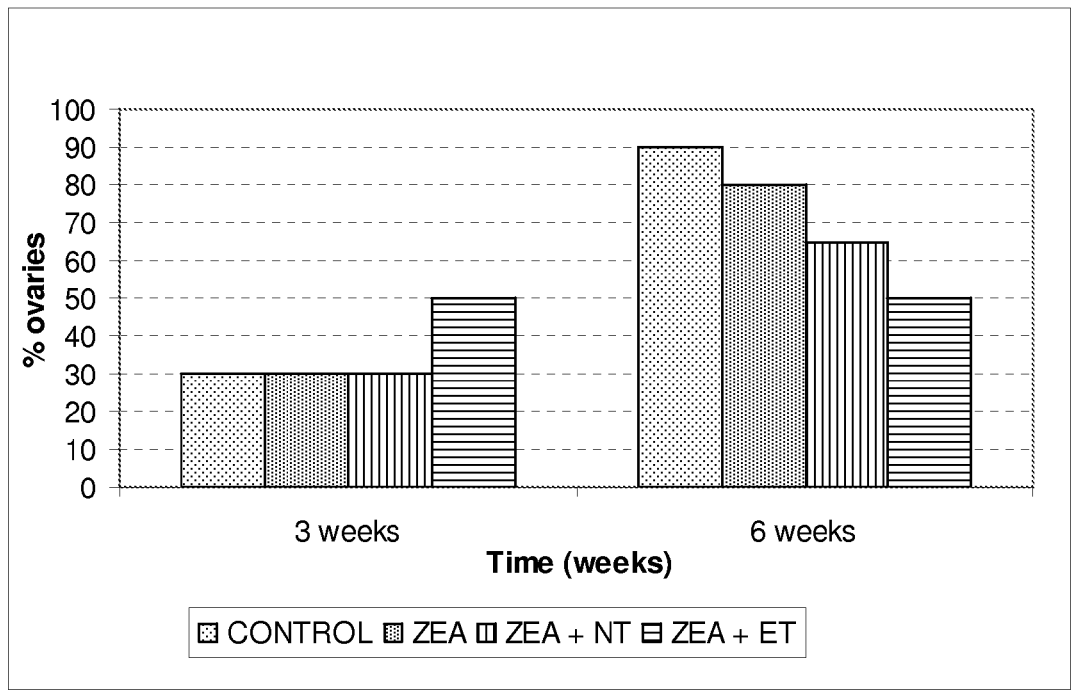
FIG. 3 is a chart of the percentage of ovaries having follicules ≤6 mm in size for different batches.
Figure 4:
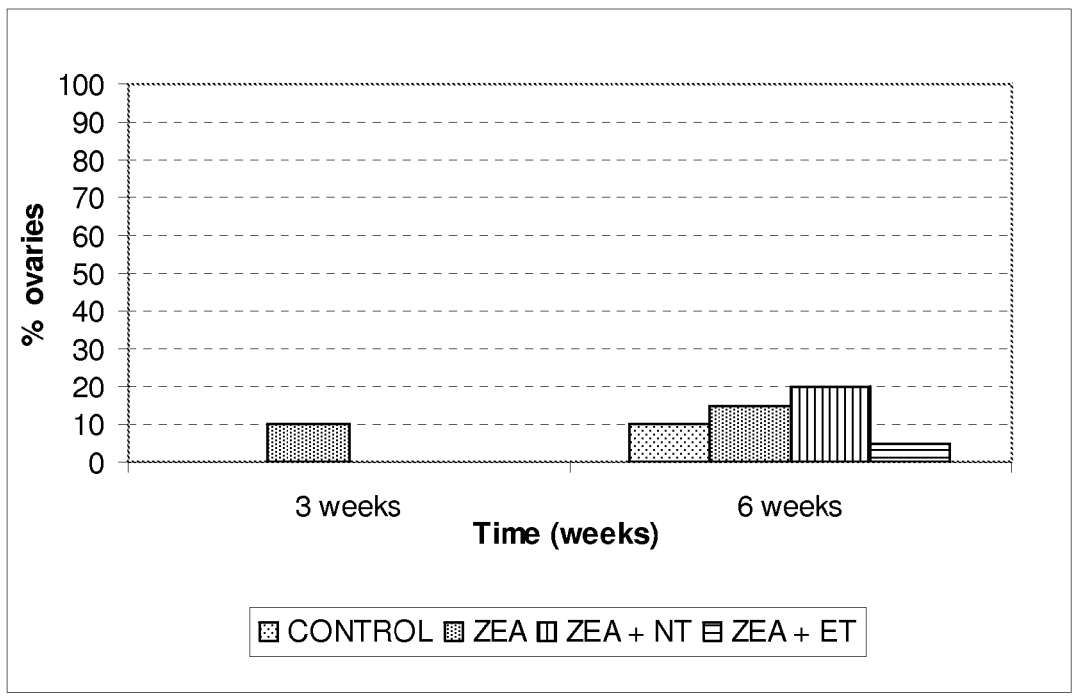
FIG. 4 is a chart of the percentage of ovaries having follicules >6 mm in size for different batches.

Another observed effect was the number of ovaries having follicules ≤6 mm in size. All ovaries recorded after sacrifice were classified by the largest size of follicle as small/medium (≤6 mm) and large (>6 mm). FIG. 3 shows low percentage of ovaries having small follicules to week 3 and a significant increase to week 6, except for ET-treated group. The percentage of ovaries having small follicules was not significantly different in the same week ($p>0.05$). FIG. 4 shows large follicules were found in ZEA-treated batch and none for the remainders after 3 weeks of diet-exposure. Within 6 weeks of exposure, large follicules were detected in all groups of gilts. The lowest counts were found in control and ET-treated batches. Overall, there were no significant differences ($p>0.05$). It is likely that any ZEA induced number or size follicules increment was masked by the effect of endogenous production, since gilts were approaching puberty. Gilts of this age and weight have a prepubertal ovarial follicular growth rate but it never ends in mature and large follicules (>6 mm)

or ovulation process. Follicules >6 mm in size and ovulated ovarian was not expected at the age of experimental gilts, then estrogenic activity of ZEA could promote these irregularities and it also explained congestion lesions found in oviducts and ovaries. After 3 weeks of exposure, the ZEA batch registered 20% of large follicules cases (>6 mm) and none for the remainders (FIG. 5). Within 6 weeks, large follicules were observed in all batches. Control and ET-supplemented batches registered the lowest cases ($p<0.05$). Ovarian hyperactivity (follicules >6 mm in size and hypoplasic ovary) increased during trial for all batches except for control. ET showed the lowest increment ($p<0.05$) which suggested that ET alleviates the ovarian hyperactiviy ZEA induces.

TABLE 33

Mean and standard deviation of reproductive organ structure measurements.
Results obtained after 3 weeks of different diet exposure.

| 3 weeks | Control | ZEA | ZEA + NT | ZEA + ET | Sig (*) |
|---|---|---|---|---|---|
| Ovary |  |  |  |  |  |
| Weight (g) | 0.62 ± 0.25 | 0.25 ± 0.25 | 0.37 ± 0.25 | 0.55 ± 0.25 | NS |
| Size (cm) | 1.55 ± 0.20 | 1.20 ± 0.20 | 1.18 ± 0.20 | 1.38 ± 0.20 | NS |
| Oviducts: |  |  |  |  |  |
| Weight (g) | 0.40 ± 0.08 | 0.44 ± 0.08 | 0.45 ± 0.08 | 0.38 ± 0.08 | NS |
| Size (cm) | 14.88 ± 1.55 | 12.65 ± 1.55 | 11.85 ± 1.55 | 13.15 ± 1.55 | NS |
| Uterine horns: |  |  |  |  |  |
| Weight (g) | 8.09 ± 2.40 | 10.50 ± 2.40 | 10.08 ± 2.40 | 10.64 ± 2.40 | NS |
| Size (cm) | 32.45 ± 4.05 | 32.70 ± 4.05 | 35.45 ± 4.05 | 35.90 ± 4.05 | NS |
| Cervix |  |  |  |  |  |
| Weight (g) | 0.40 ± 0.14 | 0.58 ± 0.13 | 0.44 ± 0.13 | 0.51 ± 0.13 | NS |
| Size (cm) | 0.63 ± 0.10 | 0.70 ± 0.09 | 0.70 ± 0.09 | 0.90 ± 0.09 | NS |
| Vagina |  |  |  |  |  |
| Weight (g) | 24.34 ± 3.75a | 36.13 ± 2.37b | 38.64 ± 3.06b | 33.96 ± 2.37ab | * |
| Size (cm) | 21.75 ± 1.87 | 21.70 ± 1.18 | 20.83 ± 1.52 | 21.80 ± 1.18 | NS |
| Weight of reproductive organ (oviducts-cervix; g) | 10.80 ± 3 | 11.77 ± 2.68 | 11.34 ± 2.68 | 12.08 ± 2.68 | NS |

(*) a-b Within a row, value with a superscript letter was significantly different
* ($p < 0.05$);
NS = Not significant ($p > 0.05$)

TABLE 34

Mean and standard deviation of reproductive organ structure measurements.
Results obtained after 6 weeks of different diet exposure.

| 6 weeks | Control | ZEA | ZEA + NT | ZEA + ET | Sig (*) |
|---|---|---|---|---|---|
| Ovary |  |  |  |  |  |
| Weight (g) | 1.34 ± 0.18 | 1.23 ± 0.18 | 1.21 ± 0.19 | 0.93 ± 0.18 | NS |
| Size (cm) | 1.99 ± 0.14 | 1.93 ± 0.14 | 1.85 ± 0.15 | 1.65 ± 0.14 | NS |
| Oviducts: |  |  |  |  |  |
| Weight (g) | 0.53 ± 0.05a | 0.77 ± 0.05b | 0.65 ± 0.06ab | 0.67 ± 0.05ab | * |
| Size (cm) | 14.76 ± 1.10 | 14.73 ± 1.10 | 16.18 ± 1.15 | 16.79 ± 1.10 | NS |
| Uterine horns: |  |  |  |  |  |
| Weight (g) | 12.63 ± 2.03a | 26.07 ± 1.7bc | 25.70 ± 1.90bc | 20.59 ± 1.79b | *** |
| Size (cm) | 37.96 ± 3.43a | 56.53 ± 2.87bc | 49.94 ± 3.21bc | 47.75 ± 3.02b | ** |
| Cervix |  |  |  |  |  |
| Weight (g) | 0.30 ± 0.11a | 0.53 ± 0.10ab | 0.62 ± 0.10bc | 0.86 ± 0.10c | * |
| Size (cm) | 0.58 ± 0.08 | 0.50 ± 0.07 | 0.56 ± 0.07 | 0.61 ± 0.07 | NS |
| Vagina |  |  |  |  |  |
| Weight (g) | 21.91 ± 5.30a | 66.34 ± 5.30c | 60.03 ± 3.75c | 42.82 ± 5.30b | * |
| Size (cm) | 26.5 ± 2.64b | 27.00 ± 2.64b | 31.25 ± 1.87b | 16.50 ± 2.64a | * |
| Weight of reproductive organ (oviducts-cervix) | 14.97 ± 2.27a | 28.17 ± 2.12b | 28.11 ± 2.12b | 23.06 ± 2.00b | * |

(*) a-c Within a row, value with a superscript letter was significantly different
* ($p < 0.05$);
** ($p < 0.01$);
*** ($p < 0.001$);
NS = Not significant ($p > 0.05$)

TABLE 35

Time effect of diet exposure on reproductive organ structures for different batches

| | Control | ZEA | ZEA + NT | ZEA + ET |
|---|---|---|---|---|
| Ovary | | | | |
| Weight (g) | * | ** | ** | * |
| Size (cm) | * | ** | * | * |
| Oviducts: | | | | |
| Weight (g) | * | ** | * | ** |
| Size (cm) | NS | * | *** | NS |
| Uterine horns: | | | | |
| Weight (g) | ** | *** | *** | ** |
| Size (cm) | * | *** | ** | * |
| Cervix | | | | |
| Weight (g) | NS | NS | NS | NS |
| Size (cm) | NS | NS | NS | * |
| Vagina | | | | |
| Weight (g) | NS | ** | * | * |
| Size (cm) | NS | * | * | NS |
| Weight of reproductive organ (oviducts-cervix; g) | * | *** | ** | ** |

(*) Within a row, value with a superscript letter was significantly different;
* ($p < 0.05$);
** ($p < 0.01$);
*** ($p < 0.001$);
NS = Not significant ($p > 0.05$)

TABLE 36

Histopathology of reproductive organ, kidney and liver after 3 weeks of different diet exposure. Results expressed in percentage of animals.

| Histopathology (3 weeks) | Control | ZEA | ZEA + NT | ZEA + ET | Sig (*) |
|---|---|---|---|---|---|
| Reproductive organ | | | | | |
| Cervix (slight) | 0% | 0% | 0% | 20% | NS |
| Oviduct (slight) | 0% | 0% | 20% | 0% | NS |
| Ovary | | | | | |
| Hypoplastic | 40% | 50% | 60% | 40% | t |
| Preovulatory | 0% | 0% | 20% | 0% | NS |
| Severe preovulatory | 0% | 0% | 0% | 0% | NS |
| Severe hypoplasia-ovulation | 0% | 25% | 0% | 0% | t |
| Kidneys | | | | | |
| Multifocal mononuclear interstitial nephritis | | | | | |
| Slight | 20% | 40% | 20% | 20% | NS |
| Moderate | 80% | 60% | 60% | 40% | NS |
| Severe | 0% | 0% | 0% | 0% | NS |
| Pyelitis | | | | | |
| Slight | 0% | 0% | 20% | 20% | NS |
| Moderate | 20% | 40% | 0% | 20% | NS |
| Severe | 20% | 0% | 0% | 20% | NS |
| Severe complications | 0% | 0% | 0% | 0% | NS |
| Pyelonephritis (slight) | 0% | 0% | 0% | 0% | NS |
| Multifocal pleomorphic interstitial nephritis | | | | | |
| Slight | 0% | 0% | 0% | 0% | NS |
| Moderate | 0% | 0% | 0% | 0% | NS |
| Glomerular dilation | | | | | |
| Slight | 0% | 0% | 0% | 0% | NS |
| Severe complications | 0% | 0% | 0% | 0% | NS |
| Glomerular congestion (slight) | 0% | 0% | 0% | 0% | NS |
| Tubular fatty degeneration (slight) | 0% | 20% | 0% | 0% | NS |
| Marrow fibrosis (slight) | 0% | 0% | 0% | 0% | NS |
| Liver | | | | | |
| Fatty degeneration | 100% | 100% | 40% | 80% | NS |
| Hydropic degeneration | 80% | 60% | 80% | 40% | NS |
| Central congestion | | | | | |
| Slight | 0% | 0% | 20% | 0% | NS |
| Moderate | 100% | 80% | 40% | 80% | NS |

TABLE 36-continued

Histopathology of reproductive organ, kidney and liver after 3 weeks of different diet exposure. Results expressed in percentage of animals.

| Histopathology (3 weeks) | Control | ZEA | ZEA + NT | ZEA + ET | Sig (*) |
|---|---|---|---|---|---|
| Distortion of the lobular architecture | | | | | |
| Slight | 20% | 0% | 0% | 0% | NS |
| Moderate | 0% | 20% | 0% | 0% | NS |
| Septal hepatitis | 100% | 80% | 60% | 60% | NS |
| Interstitial hepatitis | | | | | |
| Slight | 100% | 80% | 40% | 80% | NS |
| Moderate | 0% | 0% | 20% | 0% | NS |
| Mononuclear cholangiohepatitis | | | | | |
| Slight | 80% | 100% | 100% | 80% | NS |
| Moderate | 0% | 0% | 0% | 0% | NS |
| Severe fribrosis | 0% | 0% | 0% | 0% | NS |
| Severe complications | 0% | 0% | 0% | 0% | NS |
| Connective tissue increment | | | | | |
| Slight | 40% | 40% | 40% | 20% | NS |
| Moderate | 0% | 0% | 0% | 0% | NS |
| Capsular fibrosis | 0% | 0% | 0% | 0% | NS | t = tendency; NS = Not significant (p > 0.05)

TABLE 37

Histopathology of reproductive organ, kidney and liver after 6 weeks of different diet exposure. Results expressed in percentage of animals.

| Histopathology (6 weeks) | Control | ZEA | ZEA + NT | ZEA + ET | Sig (*) |
|---|---|---|---|---|---|
| Reproductive organ | | | | | |
| Cervix (slight) | 0% | 0% | 0% | 11% | NS |
| Oviduct (slight) | 0% | 70% | 33% | 22% | NS |
| Ovary | | | | | |
| Hypoplastic | 10% | 0% | 0% | 10% | NS |
| Preovulatory | 0% | 33% | 44% | 20% | NS |
| Severe preovulatory | 0% | 0% | 11% | 20% | NS |
| Severe hypoplasia-ovulation | 0% | 22% | 11% | 0% | t |
| Kidneys | | | | | |
| Multifocal mononuclear interstitial nephritis | | | | | |
| Slight | 60% | 20% | 44% | 10% | NS |
| Moderate | 30% | 40% | 22% | 60% | NS |
| Severe | 0% | 20% | 0% | 0% | NS |
| Severe complications | 0% | 0% | 22% | 20% | NS |
| Pyelitis | | | | | |
| Slight | 20%a | 20%a | 33%a | 60%b | * |
| Moderate | 0%a | 10%a | 33%a | 40%b | * |
| Severe | 0% | 20% | 0% | 0% | NS |
| Severe complications | 0% | 0% | 0% | 0% | NS |
| Pyelonephritis (slight) | 0% | 10% | 0% | 0% | NS |
| Multifocal pleomorphic interstitial nephritis | | | | | |
| Slight | 10% | 0% | 0% | 0% | NS |
| Moderate | 0% | 10% | 0% | 0% | NS |
| Glomerular dilation | | | | | |
| Slight | 0% | 20% | 0% | 0% | NS |
| Severe complications | 10% | 10% | 0% | 0% | NS |
| Glomerular congestion (slight) | 0% | 10% | 10% | 0% | NS |
| Tubular fatty degeneration (slight) | 0% | 10% | 0% | 20% | NS |
| Marrow fibrosis (slight) | 0% | 10% | 11% | 40% | NS |
| Liver | | | | | |
| Fatty degeneration | 80% | 80% | 100% | 90% | NS |
| Hydropic degeneration | 100% | 100% | 100% | 100% | NS |

TABLE 37-continued

Histopathology of reproductive organ, kidney and liver after 6 weeks of
different diet exposure. Results expressed in percentage of animals.

| Histopathology (6 weeks) | Control | ZEA | ZEA + NT | ZEA + ET | Sig (*) |
|---|---|---|---|---|---|
| Central congestion | | | | | |
| Slight | 90% | 70% | 67% | 40% | NS |
| Moderate | 0% | 30% | 33% | 60% | NS |
| Distortion of the lobular architecture | | | | | NS |
| Slight | 40% | 20% | 56% | 70% | NS |
| Moderate | 0% | 10% | 0% | 10% | NS |
| Septal hepatitis | 80% | 100% | 100% | 90% | NS |
| Interstitial hepatitis | | | | | |
| Slight | 10%a | 80%b | 67%b | 70%b | * |
| Moderate | 30% | 20% | 33% | 30% | NS |
| Mononuclear cholangiohepatitis | | | | | |
| Slight | 90%b | 80%b | 56%b | 10%b | *** |
| Moderate | 10% | 10% | 44% | 40% | NS |
| Severe fribrosis | 0% | 0% | 0% | 50% | t |
| Severe complications | 0% | 0% | 0% | 0% | NS |
| Connective tissue increment | | | | | |
| Slight | 13% a | 60%b | 64%b | 40%b | * |
| Moderate | 20% | 7% | 0% | 27% | NS |
| Capsular fibrosis | 10% | 30% | 11% | 20% | NS |

(*) a-bWithin a row, value with a superscript letter was significantly different;
NS = Not significant;
* ($p < 0.05$);
*** ($p < 0.01$); ($p > 0.05$)

Conclusions

A dietary concentration of 1 ppm of Zearalenone and 3000 ppm of adsorbents did not promote worsening or improvement in productivity traits after 6 weeks of exposure, nor did they impair liver enzymatic function or blood parameters. The ET adsorbent was found to be more effective than the NT adsorbent to alleviate visual hyperestrogenism effects (tumefaction-swelling and enlargement of vulva) from week 3 to week 6. The histological evaluation demonstrated that hyperactive ovary (hypoplasic ovary and large follicules) induced by zearalenone exposure could be reduced significantly by adding the ET absorbent to the animal diet, and that the ET-adsorbent promoted normal hypothalamo-hypophysial responsiveness to estrogen in that E2 plasma concentration remained constant (basal levels).

In summary, 1 ppm of ZEA confers multi-organ toxicity in prepubertal gilts after 6 weeks of exposure and ET provides a partial or complete toxic sparing effect of this mycotoxin.

Example 10

The purpose of this method is to provide an analytical tool for the in vitro evaluation of mycotoxin detoxifying efficiency. Potential sequestering agents or "mycotoxin binders" against several mycotoxins can be evaluated using this method. Adsorption in an acidic environment (pH 3.0), mimicking the pH of the stomach of a monogastric animal and desorption at pH 6.8 mimicking conditions in the intestine of a monogastric animal are measured in this assay. The net percentage of mycotoxin detoxifying efficiency is determined as adsorption percentage minus desorption percentage. This "two-phase" in vitro mycotoxin efficiency test is a relatively simple and a direct measure of toxin binding efficiency measured at varying pH.

Prepare two 0.1M phosphate buffers (pH 3 and pH 6.8) are prepared. Weigh 17.799 g+/−0.1 g $Na_2HPO_4.2H_2O$ in a glass beaker. Dissolve in 950 ml de-ionized water. Check pH of the prepared solution and adjust it to the desired pH (pH 3 and pH 6.8) by adding $H_3PO_4$ and 1N NaOH. Fill up to 1 L with de-ionized water in a volumetric flask.

A stock solution of zearalenone is prepared by dissolving 10 mg of zearalenone (Sigma or equivalent) in 100 ml acetonitrile (HPLC grade).

Description of Test Procedure

Step 1—Adsorption Under Acidic pH Conditions (Mimicking Gastric pH)

Prepare a "buffer at pH 3.0 for the toxin stock solution" by adding an appropriate amount of the mycotoxin stock solution to the 0.1 M phosphate buffer pH 3.0 to yield a suggested final concentration of 300 ppb. One should note that this concentration is merely a recommendation.

Add an amount (+/−1 mg) of sequestering agent to a centrifuge tube to obtain a final desired concentration (usual sequestering agent concentrations to be tested are in the range of 0.1-1.0%). Add an amount of "buffer pH 3.0 toxin stock solution" to obtain the sequestering agent concentration that needs to be tested and cap the centrifuge tube. A common test condition is 0.5% sequestering agent in 10 ml buffer, which corresponds to 50 mg sequestering agent in 10 ml buffer.

Standards are treated the same way as the samples with the exception that no sequestering agent is added. Therefore, a centrifuge tube filled with "buffer at pH 3.0 for the toxin stock solution" runs the whole procedure together with the adsorption samples. Afterwards, a standard serial dilution is prepared from this standard by diluting in appropriate buffer. HPLC analyses of these standard dilution series are used to calculate the adsorption results of the samples.

Shake for 1 hour at room temperature on a rocking shaker at a speed capable to distribute the sequestering agent 'homogeneously' in the solution. Centrifuge the tube to yield a clear supernatant. Add the supernatant to a HPLC vial.

Dispose the remaining supernatant by decantation and pipette into the provided waste beaker without removal of the sequestering agent sediment before proceeding to step 2.

Step 2—Desorption Under Near Neutral pH Conditions (Mimicking Intestinal pH)

Add an equal amount (as in step 1) of 0.1 M phosphate buffer pH 6.8 without toxin to the residue, cap the centrifuge tube and resuspend the residue. Usually shaking by hand is sufficient, sometimes shaking on a vortex mixer is needed.

Prepare a "buffer at pH 6.8 for the toxin stock solution" by adding appropriate amounts of mycotoxin stock solution to the 0.1 M phosphate buffer pH 6.8.

Standards are treated the same way as the samples with the exception that no sequestering agent is added. Therefore, a centrifuge tube filled with "buffer pH 6.8 toxin stock solution" runs the whole procedure together with the desorption samples. Afterwards, a standard dilution series is prepared from this standard by diluting in appropriate buffer. The HPLC analyses of these standard dilution series are used to calculate the adsorption/desorption results of the samples.

Shake the tubes for 1 hour at room temperature on a rocking shaker at a speed capable to distribute the sequestering agent homogeneously in the solution. Centrifuge the tubes to yield a clear supernatant. Add the supernatant to a HPLC vial.

HPLC Analysis: HPLC Conditions

Due to the different nature of the samples (buffered samples, interference of compounds in the sequestering agents, etc.), modifications in the HPLC conditions may be required. Since standards are treated and analysed in the same way as the samples were, calculations are done referring to the corresponding standards (standards pH 3.0 for adsorption samples, standards pH 6.8 for desorption samples).

HPLC Conditions

The buffering of the samples results sometimes in poor chromatography when HPLC conditions of the original internal instructions were applied. Acidification of the original eluent by replacing the water with e.g. 2% glacial acetic acid in water (v/v), was beneficial for the chromatography. Therefore, some slight modifications in original HPLC conditions were introduced to overcome the influence of the buffer on the chromatogram quality.

The HPLC system used was a Pump-Perkin Elmer Series 200 with a Perkin Elmer Series 200 autosampler fitted with 100 μl loop. The column was a LUNA 5 um C18-2, 250×4.6 mm. The UV/Vis detector was a Perkin Elmer model 200, fluorescence, Perkin Elmer Model 200. The HPLC conditions for zearalenone analyses in 0.1 M phosphate buffer pH 3.0 and 6.8 were: The eluent was 2% acetic acid in water (v/v)/acetonitrile 50/50 at a flow rate of 1 ml/min; the column temperature was set at 40° C.; an injection volume of 20 μl was used; the excitation wavelength was 274 nm and the emission wavelength was 450 nm.

Calculation

Compare the areas and the retention times of the samples with those of the appropriate external standard.

$$\text{Mycotoxin binding efficiency (\%)} = \text{Adsorption (\%)} - \text{Desorption (\%)}$$

$$\text{Adsorption (\%)} = \frac{(\text{area toxin in "buffer pH 3.0 toxin solution"} - \text{area toxin in supernatant of step 1})}{(\text{area toxin in "buffer pH 3.0 toxin solution"})} \times 100$$

$$\text{Desorption (\%)} = \frac{\text{area toxin in supernatant of step 2}}{\text{area toxin in "buffer pH 6.8 toxin solution"}} \times 100$$

Remarks

Döll et al. describe their in vitro test procedure in the article "In vitro studies on the evaluation of mycotoxin detoxifying agents for their efficacy on deoxynivalenol and zearalenone" (Archives of animal nutrition, August 2004, Vol. 58 (4), pp. 311-324. In this article they evaluate the effect of different parameters (pH, time of incubation, amount of buffer added) on the detoxifying capacity of a binder in their test. They note that all these parameters have their effect on the test result. When performing these kinds of in vitro tests, which comprise many different parameters, one should be aware that relatively small changes in one or more parameters could have an effect on the test result.

A study was performed on the in vitro evaluation of the mycotoxin detoxifying efficiency of potential sequestering humic acid containing substances derived from peat against zearalenone. The peat used was bioAPT™ size 30 fines (small granules) obtained from American Peat Technologies, Aitkin, Minn. Mineral oil, also known as white oil or oil of a non-vegetable origin, was added to the peat at 3% and 6% by weight to see if it affected binding efficiency. Examples of commercial white oil include Citation™ 90 KEM NF Grade Mineral Oil sourced from AVATAR Corporation or Duo Prime 90 sourced from Lonza. The peat and peat with oil were compared against Kallsil™, a dry anti-caking aid and non-nutritive carrier (Kemin Industries, Des Moines, Iowa), vermiculite and zeolite. Adsorption in an acidic environment (pH 3.0)—mimicking the pH of the stomach of a monogastric animal—and desorption at near neutral pH (pH 6.8)—mimicking pH conditions in the intestine of a monogastric animal—were measured. The net percentage of mycotoxin detoxifying efficiency was determined as adsorption percentage minus desorption percentage.

Duplicate aliquots of 0.1 M phosphate buffer (adjusted to pH 3.0) containing 300 ppb zearalenone in solution (10 ml) were added to 15 ml screw cap Falcon polypropylene tubes to which had been added 0.05 gram of each adsorbent. Test tubes were placed on an orbital shaker for 60 minutes at room temperature. Each mycotoxin test solution was centrifuged at 4000 rpm for 10 minutes. The aqueous supernatant was isolated for mycotoxin analysis (adsorption). The pellet was resuspended in 0.1 M phosphate buffer pH 6.8. Test tubes were placed again on an orbital shaker for 60 minutes at room temperature and afterwards centrifuged at 4000 rpm for 10 minutes. The aqueous supernatant was analyzed for zearalenone (desorption). The zearalenone detection was performed by HPLC analysis. Buffered zearalenone test solutions (pH 3.0 or 6.8) without adsorbents were used as standard.

The HPLC analyses were performed on an SP8800 Ternary LC Solvent Delivery System with helium degassing (Spectra Physics, USA), a SP 8880 autosampler (Spectra Physics, USA) with 20 μl loop, a Chromjet integrator (Thermo, USA), a Croco Cil™ column heater (Cluzeau Info Labo, France) and an UV-fluorescence detector FP-920 (Jasco, Japan), Chromsep Nucleosil 100-5 C18 SS 250*4.6 mm (L*ID) columns (Varian, the Netherlands) or equivalent. The columns were protected with an appropriate guard column. An aliquot of the original buffered zearalenone test solution was used as the HPLC standard.

A summary of the in vitro mycotoxin adsorption by five samples is presented in Table 38. The results showed that all the products effectively adsorbed zearalenone at pH 3.0 (adsorption above the minimal required value of 85%), except for zeolite and vermiculite with 3% mineral oil. Notable differences were observed for the desorption at pH 6.8. The products vermiculite with 3% oil and peat with oil both were shown to exceed the maximal value of 10% desorption. The other three samples met the requirement.

TABLE 38

In vitro binding of zearalenone by humic acid containing substances at pH 3.0 and 6.8.

| | In vitro ZEA Binding | | | | |
|---|---|---|---|---|---|
| | Adsorption (%) | | Desorption (%) | | Efficiency (%) |
| Adsorbent | Mean | SD | Mean | SD | Mean |
| Kallsil | 90 | | 7 | | 83 |
| Peat/3% Oil | 89 | | 21 | | 68 |
| Peat/6% Oil | 89 | | 22 | | 67 |
| Peat | 85 | | 10 | | 75 |
| Ver/Oil | 79 | | 13 | | 66 |
| Ver | 85 | | 7 | | 78 |
| Zeolite | 0 | | 0 | | 0 |

These results demonstrate that peat binds aflatoxin and zearalenone substantially the same as zeolite, thus providing an alternative binding material that is an organic material instead of a mineral.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. A mycotoxin binder for animal feeds, comprising humic substances derived from peat and an in vitro mycotoxin binding efficiency for zearalenone of at least 80% with adsorption of at least 80% at the biological pH of the stomach of a monogastric animal and desorption not greater than 10% at neutral pH.

2. The mycotoxin binder of claim 1, further comprising mineral oil of up to 6% by weight of the humic substances.

* * * * *